United States Patent [19]

Repass et al.

[11] Patent Number: 4,648,071

[45] Date of Patent: Mar. 3, 1987

[54] DESIGNATION OF FOOTNOTES AND FOOTNOTE REFERENCE

[75] Inventors: James T. Repass, Round Rock; Thomas M. Ruiz; Kenneth O. Shipp, Jr., both of Austin; Richard B. Wood, Round Rock, all of Tex.

[73] Assignee: International Business Machines Corporation, Armonk, N.Y.

[21] Appl. No.: 778,750

[22] Filed: Sep. 23, 1985

Related U.S. Application Data

[63] Continuation of Ser. No. 378,929, May 17, 1982, abandoned.

[51] Int. Cl.[4] .............................................. G06F 9/00
[52] U.S. Cl. .................................................. 364/900
[58] Field of Search ............................... 364/200, 900

[56] References Cited

U.S. PATENT DOCUMENTS 2,762,485  9/1956  Bafour et al. .
4,308,582  12/1981  Berger ................................ 364/300

FOREIGN PATENT DOCUMENTS 771551  4/1957  United Kingdom .

OTHER PUBLICATIONS

IBM Displaywriter System Manual, 1980, IBM Chapters 2, 3, 18, 19 and 21.
The Seybold Report on Office Systems—Seybold Publication Inc., Mar. 1982.
Wordstar General Information Manual, 5-1981, pp. 7-1-8-12.
"Northern Virginia Community College Catalog", 1981, pp. 38 and 39, Northern Virginia Community College.
Document Composition Facility: Users Guide", IBM, 9-1982.
Seybold Publications, Inc., "The Seybold Report on Word Processing", Jun. 1979.
*Information Storage and Retrieval,* vol. 10, No. 5/6, 1974, pp. 211-228, Pergamon Press, Oxford, V. J. Ryan et al, "Computerized Text Editing and Processing with Built-In Indexing".

*Primary Examiner*—Gareth D. Shaw
*Assistant Examiner*—John G. Mills
*Attorney, Agent, or Firm*—J. H. Barksdale

[57] ABSTRACT

A method of, and system for, designating footnotes and footnote references based on, and beginning with, an operator defined initial designation. The initial designation can be made up of both a variable functional portion and an accompanying fixed aesthetic portion. The functional portion is for numbering and can be either a numeric or other graphic character. The fixed portion can be both cosmetic and functional and can be made up of a character or characters. The designation can be located either on-line or in an indexed position. When numeric characters are used in number designating footnotes and footnote references, there is an incrementing by one of the operator selected initial number for each succeeding footnote and footnote reference designated. When other graphic characters are used in number designating footnotes and footnote references, the number of graphic characters is increased by one for each succeeding footnote and footnote reference designated. The initial designation can be selected to include either any number or number of graphic characters for numbering purposes. Also, numbers and the number of graphic characters can be reset, on a section basis such as by document page or chapter, to those initially defined. Further, if there is to be an intermingling of numeric and other graphic characters for designating footnotes and footnote references, incrementing and increasing of the numeric and other graphic characters is from the corresponding numeric or other graphic character last used for designating a footnote and footnote reference.

11 Claims, 25 Drawing Figures

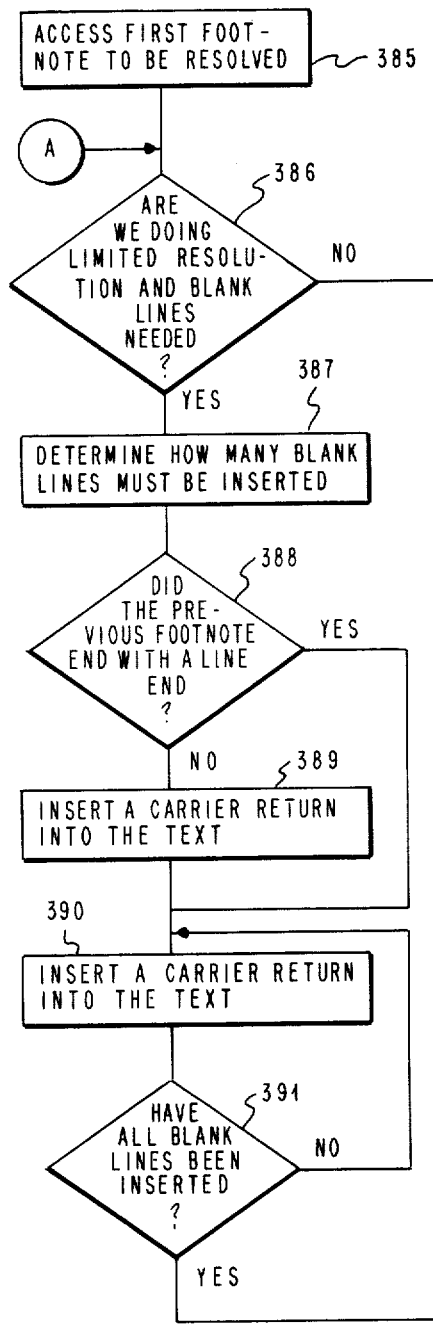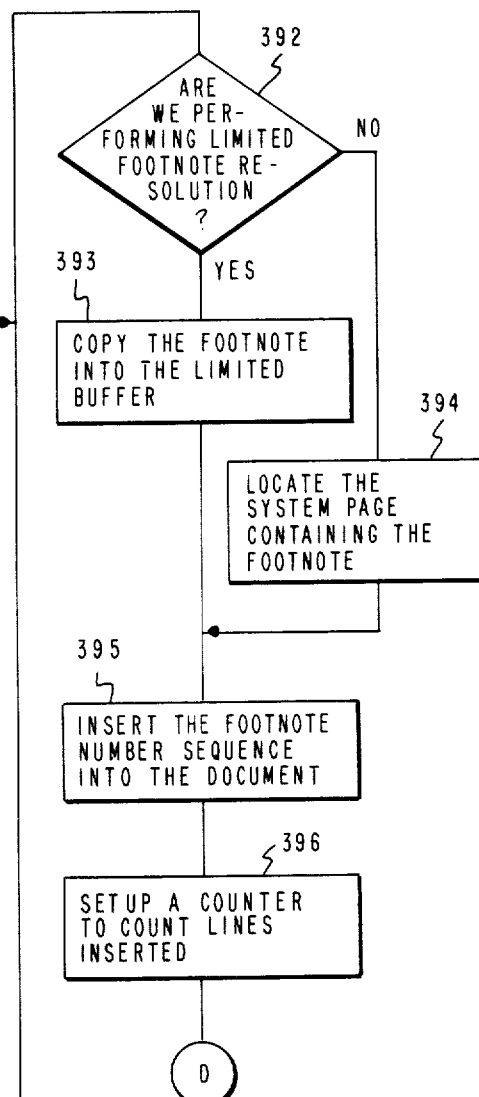
FIG. 16A

DESIGNATION OF FOOTNOTES AND FOOTNOTE REFERENCE

This is a continuation of application Ser. No. 378,929 filed May 17, 1982, now abandoned.

CROSS REFERENCE TO RELATED APPLICATIONS

Commonly assigned U.S. application Ser. No. 378,944, now abandoned, entitled Footnote Formatting, having J. T. Repass et al. as inventors, and filed concurrently herewith.

Commonly assigned U.S. application Ser. No. 378,936, now abandoned, entitled Footnote Management for Display and Printing, having J. T. Repass et al. as inventors, and filed concurrently herewith.

Commonly assigned U.S. application Ser. No. 378,946 entitled Footnote Assembly Management, having V. Cuan et al as inventors, and filed concurrently herewith.

TECHNICAL FIELD

This invention relates generally to footnoting documents, and more specifically to a method of, and system for, designating both footnote references in body text, and corresponding footnotes.

BACKGROUND ART

Footnoting of a document such as a legal brief, book, manuscript, etc. is a well known technique of providing both uncluttered and smooth flowing information and thoughts, and background or supporting detail to a reader at different locations within the document. The smooth flowing information is the body text of a document, and the supporting detail is made up of footnote text. In constructing such a document, efficient management has always been an elusive skill. This was so when documents were handwritten, and still presents a significant economic and throughput burden today. This is so even with the availability of flexible keyboard/display word processing systems.

During the handwritten document era, a footnote reference too low on a page often left insufficient room for an aesthetically pleasing, and well placed and proportioned, accompanying footnote or a portion thereof. The solution was to terminate the page earlier than desired, abut text against the bottom of the page and chance mismanagement of the succeeding page, write smaller, etc. Mismanagement and/or early termination remain major problems today. This is so even with the availability of modern word processing systems. The available approaches for an operator or author in preparing a footnoted document are for the most part undesirable. Excessive planning is probably the most common approach, and yet, multiple drafts are the most common result. Partially filled pages, an excessive number of footnote references and footnotes appearing on different pages, and unappealing proportion mismatch of body and footnote text, and an excessive number of pages containing only footnotes remain major problems following planning and multiple drafts.

The above mentioned problems have not gone unnoticed, however. One system on the market today provides for footnote management upon printout. With this system, an operator can prepare a footnoted document in one pass, but particular operator attention is required. During preparation, body text is keyed to a body text frame up to a reference point, a footnote reference number is keyed, a footnote frame is called, a corresponding footnote number is keyed, text for the footnote is keyed, and then the body text frame is recalled. Body and footnote text are stored separately. The footnote text is stored in a footnote library for later recall. Following document preparation, there is an opportunity to separately review and edit the body and footnote text, but there is no opportunity to display review and edit an assembled document prior to printing. That is, the first opportunity an operator has to view an assembled document is following printing. During printout, the system merges the body and footnote text. However, resulting aesthetics on occasion are less than desired. This is due in part to imposed system restraints such as a requirement that there be at least one line of body text on each page. In this case, large unprinted areas on numerous pages can occur. On the whole though, planning and multiple drafts are reduced, and preparation is in a logical manner. Even so, glaring disadvantages still exist. The most notable is that the ability to efficiently edit and/or make changes is severely restricted. An example of a result of a simple editing attempt is loss of correspondence between footnote reference designations and footnote designations if footnotes are to be added, intermingled, repositioned, etc. Inserting a reference designation among existing reference designations requires a subsequent additional operation for redesignating all following reference designations. This is also the case for footnote designations if a footnote is to be inserted or deleted. Another disadvantage is the above mentioned attention that is required of an operator. An error in either a footnote reference designation or a footnote designation can either prevent later document assembly during printout, or require additional editing and printout.

With the above in mind, additional related problems exist and flexibility of available systems is somewhat restricted. Readdressing the handwritten document era for a moment, mere designation of footnote references and footnotes, standing alone, was fraught with problems. An author in referencing a footnote could readily apply the same designation to both a reference point and corresponding footnote if the designation for a prior reference and footnote were recalled or on the same page. However, a loss of recollection and an absence of a prior same page designation required either a note pad and pen or leafing through previously prepared pages. Obtaining a final inked copy with a minimum number of drafts required particular writer attention. Editing of inked copy was unacceptable, if not impossible. Paint and lift-off compositions are more modern day conveniences. Although other problems were present, the above mentioned problems alone quelled most desires to be unique in the designation area.

Advancing again to the present, modern day keyboard/display word processing systems, although beneficial in many respects, have not been structured and/or programmed to efficiently handle even rather simple designation problems. For one thing, many envisioned approaches to handling even mundane author desires required programming and/or structure additions which would be prohibitive from a cost standpoint. With this in mind, any thoughts of providing for different types of footnotes such as book and magazine descriptions with different typestyles, and using different designations for each, have quickly been abandoned.

This fact has not been diminished in any respect when a desire to reset designations on a chapter basis, and/or designations are to be made up of both fixed and variable data, have been considered. When these considerations are coupled with the fact that separately stored body and footnote text must be brought together with a reasonable per page correspondence between footnote references and corresponding footnotes, there has been a compounding of the envisioned tasks and problems.

The above described capabilities of penmanship and word processing systems are prior art to the extent that a semblance of a desired end result is achievable. What has not been achievable though, are the flexibility to efficiently both meet author desires and manage designation tasks from input to output. It is these deficiencies which cause the prior art to fall short of either anticipating or rendering the instant invention obvious. More specifically, the ability to automatically designate footnotes and footnote references based upon operator initially selected and updated designations is lacking.

DISCLOSURE OF THE INVENTION

A unique method of, and system for, designating footnotes and footnote references is provided in order to reduce operator attention and errors, and meet author desires and needs. Prior to input of a document, a menu is presented to the operator for selecting and defining a makeup of desired footnote and footnote reference designations. The operator has the flexibility of defining designations by specifying a variable data category such as a numeric or other graphic character, the initial variable data such as the numeral 3, fixed data surrounding the variable data such as parentheses, and a vertical location for the designations such as half indexed up on a line. Thereafter, body text is keyed up to a footnote reference point. During this body text keying, the text is displayed and editing is permitted. At the footnote reference point, a menu is called from which a footnote task is selected. This causes a display frame to be presented for keying the footnote. Editing of the footnote is also permitted. Following input of the footnote, the operator recalls the body text display frame for continued keying, and the footnote is stored away in a footnote library. Upon recall of the body text display frame, the system applies an appropriate footnote reference designation to the body text in a defined vertical location at the footnote reference point, and logs the location in the footnote library of the corresponding footnote. For example, if a previous footnote reference designation were a bracketed two ([2]), half indexed up on a line, the appropriate footnote reference designation would be a bracketed three ([3]), half indexed up on the line being operated upon. The operator also has the ability to update the variable data, reset the variable data to its initial value, and select new variable data to be intermingled with initially selected variable data, with the system providing the necessary and desired sequencing. For example, the operator can cause the designation at the next footnote reference point to be an underscored asterisk ($\underline{*}$) by re-specifying the variable data, and the surrounding fixed data. A subsequent reference point designation will be $\underline{**}$. A recall of the original designation makeup will result in the next reference point being designated with a bracketed four ([4]), half indexed up on the line. As such, the system automatically manages designation of footnote references and corresponding footnotes once the designations have been defined or updated. Should later editing necessitate changes in the variable data, this will also be automatically taken care of by the system. Following input keying of the body and footnote text, operator procedure calls for causing the system to assemble the body and footnote text. The assembly operation involves combined merge and pagination operations. Following assembly, the document can be display recalled on a page basis for review and editing. Thereafter, the document is ready to be printed.

BRIEF DESCRIPTION OF THE DRAWING

FIGS. 10–18 are flow charts corresponding to Tables 1–9 in the following Best Mode for Carrying Out the Invention section of this application.

BEST MODE FOR CARRYING OUT THE INVENTION

General Description

Figure 1:
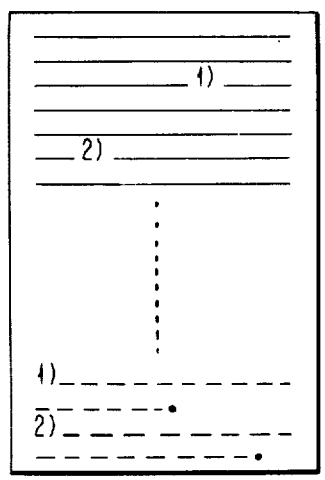
FIG. 1 is a pictorial representation of a page of a footnoted document illustrating one set of footnote and footnote reference designations.
Figure 2:
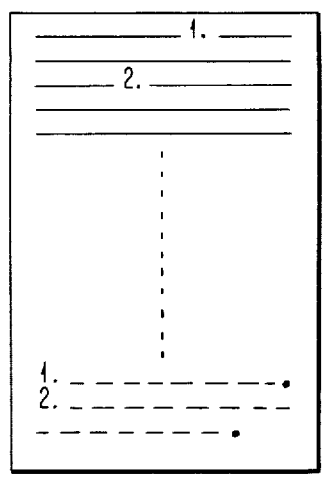
FIG. 2 is a pictorial representation of another set of footnote and footnote reference designations.
Figure 3:
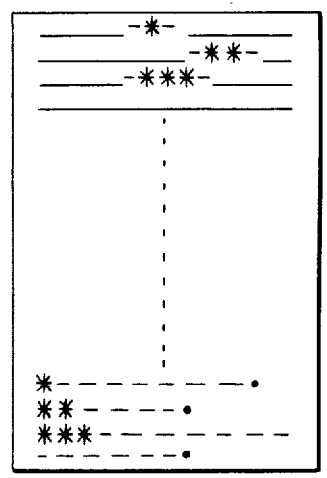
FIG. 3 is a pictorial representation of yet another set of footnote and footnote reference designations.

For a general understanding of the invention, reference is first directed to FIGS. 1 through 3. In these figures are illustrated three pages which can be taken as the first page of any three chapters of a footnoted document. Alternatively, the three pages can be considered to be the first footnoted pages of three different documents. The solid lines represent body text and the dashed lines represent footnote text.

For purposes of the following explanation, it is to be noted that the Arabic numerals 1 and 2 in FIG. 1 along with the close parenthesis symbols are positionally located, half indexed up on the lines with which they appear. In FIG. 2, the numerals 1 and 2 and the periods appear on line with the remainder of the lines with which they appear. In FIG. 3, the asterisks and hyphens also appear on line with the remainder of the lines with which they appear. The Arabic numerals 1 and 2, and the asterisks make up a variable portion of the overall designations. The close parenthesis, periods, and hyphens make up a fixed portion of the designations.

The variable portions of the designations are functional and are for purposes of numbering the footnote references and footnotes. These portions are variable in that they will change from footnote to footnote and footnote reference to footnote reference. The fixed portions of the designations can be both functional and cosmetic. These portions will remain fixed from footnote to footnote and footnote reference to footnote reference, until changed by either the system or the operator as will be more fully described later herein. The fixed portions can be functional in that they may be varied for different types of background material such as magazines and books. These portions can be cosmetic in that they may be selected and used to improve the aesthetic qualities of the document being prepared.

From the above, both Arabic numerals or numeric characters, and other graphic characters can be used to define the variable portion of the designations. In the preferred embodiment being described, when numeric characters are selected, there will be an incrementing by one of an initially selected number for each following designation. When other graphic characters are selected, there will be an increase by one in the number of characters for each following designation. The fixed portion of the designations can be any character or combination of characters which are alternatively referred to later herein as leading text and/or trailing text. For example, a number one (1) can be merely followed by a hyphen, or totally surrounded with a preceding hyphen, an overstrike, a following hyphen, and an underscore. In addition, the designations can be made up of variable portions only. As is obvious, confusion will be avoided if different characters are selected for the fixed and variable portions of the designations.

In defining the variable portion of the designations, an operator can select any beginning number or number of characters. For example, the number 3 can be selected. If so, and from the above, the following designation will include the number 4. If two asterisks are selected as the variable portion of a beginning designation, the following designation will be three asterisks. This is since the system is programmed to sequence the variable portion of the designations. The system is also programmed to sequence designations having common variable portions irrespective of intermingled non-common variable portions. For example, if the order and makeup of designations is 3, 4, , and *, and the operator again calls for Arabic numerals, the next designation will be the number 5. In addition, an operator can specify a resetting of the variable portion of the designations to that initially defined such that, for example, designations are chapter or page oriented. That is, footnotes and footnote references can be renumbered beginning with the number 1 at the beginning of each chapter or page of a book.

The fixed and variable portions of the footnote and footnote reference designations along with the positional relationship thereof to the remainder of the line, are initially defined by the operator specifying or selecting choices from a menu at the beginning of the job of document preparation. These selections will remain in effect until changed. Operator tasks of specifying and defining designations will be brought out in greater detail later in the specification. For now though, it is sufficient to note that flexibility in specification and definition extends from only variable data to fixed and variable data positionally located.

Figure 4:
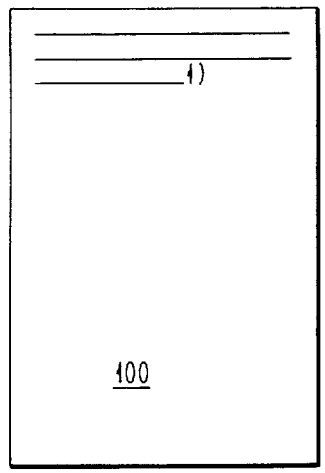
FIG. 4 is a pictorial representation of a body text frame including inputted body text to the point of a first footnote reference.
Figure 5:
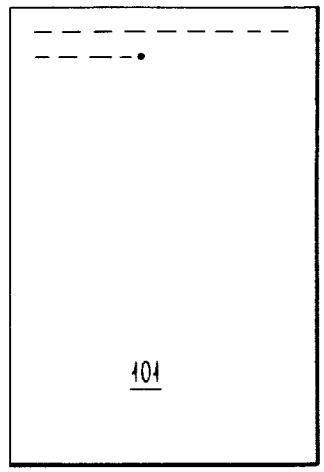
FIG. 5 is a pictorial representation of a footnote text frame including inputted footnote text referenced by the reference point in FIG. 4.

Now it is to be assumed that an operator is keying to a word processing system having a display sufficiently large enough to display any one of the pages shown in FIGS. 1 through 3. Further it is to be assumed that body text has been keyed or input to the point of footnote reference numeral 1 in FIG. 1. The keying of body text is to a body text frame 100 shown in FIG. 4. At the point of footnote reference numeral 1, the operator calls for presentation or display of a footnote text frame 101 shown in FIG. 5. This frame is for keying or inputting footnote text for footnote 1 in FIG. 1. When the footnote text frame is called, the body text will be stored separately from the to-be-keyed footnote text. Upon completion of keying of the footnote text for footnote 1 in FIG. 5, the operator recalls frame 100. At this time, the system will automatically store away the footnote text of frame 101 in a footnote library, recall frame 100, display the numeral 1 in frame 100, and await further operator keying of body text from the point of numeral 1 in frame 100.

Figure 6:
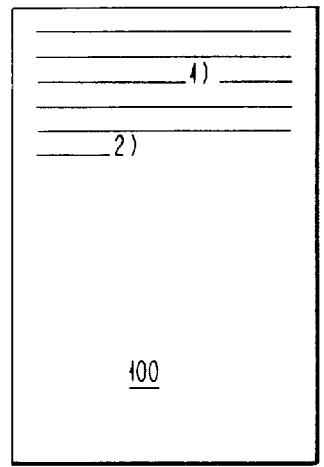
FIG. 6 is another pictorial representation of the body text frame shown in FIG. 4 having additional inputted body text to the point of second footnote reference.
Figure 7:
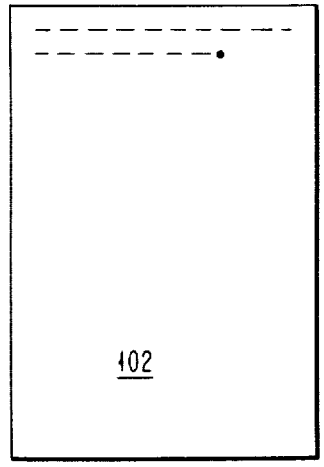
FIG. 7 is a pictorial representation of another footnote text frame having inputted footnote text for the second footnote reference in FIG. 6.

Following keying to the point of footnote reference numeral 2 in FIG. 6, the operator again calls for display of a footnote text frame. Footnote frame 102 shown in FIG. 7 will be displayed for keying of the footnote text for footnote 2. Following the keying of footnote text for footnote 2 in frame 102, frame 100 is again recalled, and the numeral 2 is displayed in frame 100 (FIG. 6).

Following input of any one of the documents having as a first page that represented in FIGS. 1 through 3, an assembly operation is required for merging the separately stored footnote and body text and for paginating the document for ultimate printing. A normal merge operation involves combining a portion of one document with another. A normal pagination operation is for dividing a document into page size segments capable of being printed on the paper being used. Such an operation generally involves inserting and deleting page end codes. The assembly operation contemplated herein for formatting a footnoted document requires far more than just separate merge and pagination operations. These operations must be performed in conjunction with one another in order to attain the desired results. There must be a balancing of the text and footnotes within a page.

For purposes of clarity, this balancing will be viewed briefly below from a conceptual, rather than an actual or preferred standpoint. The preferred embodiment will be set out in the following detailed description section of this application. First, a page buffer is loaded from the top with body text to the point of the first footnote reference point. Then the corresponding footnote text is loaded from the top of a footnote section of the page buffer. The page buffer is defined by a specified number of lines. The footnote section is located at the bottom of the page buffer and is defined in terms of a maximum number of footnote lines. As such, the top of the buffer is a body text section and is indirectly defined in terms of a minimum number of lines. Footnote text is input to the footnote section beginning at the top thereof. If the text for the entire footnote will fit within the footnote section, operation continues from the point of the first footnote reference point with the loading of additional body text into the page buffer. If the footnote section is full, this operation continues until either the body text section is full or up to a line before a line containing another footnote reference. If the body text section can be filled without any additional footnote references, this is accomplished and operation begins for the next page of the document. If an additional footnote reference is encountered, operation terminates with the end of the preceding line and the page has been defined. This is even though the page will contain fewer lines than possible.

On the other hand, if the footnote section has additional lines available, additional lines of body text can be loaded into the page buffer. Whether this will occur will depend on both the number of lines remaining in the footnote section and whether the additional lines of body text loadable or to be loaded contain additional footnote references. If both an additional body text line containing a footnote reference and at least one line of the corresponding footnote text can be loaded into the page buffer, this will be effected. If additional lines of body text contain no footnote references and additional lines are available in the footnote section, the available lines are filled with body text and the footnote section is moved to the bottom of the page buffer. That is, as each line of body text is loaded into the footnote section, the footnote text is shifted down one line.

Detailed Description

Figure 8:
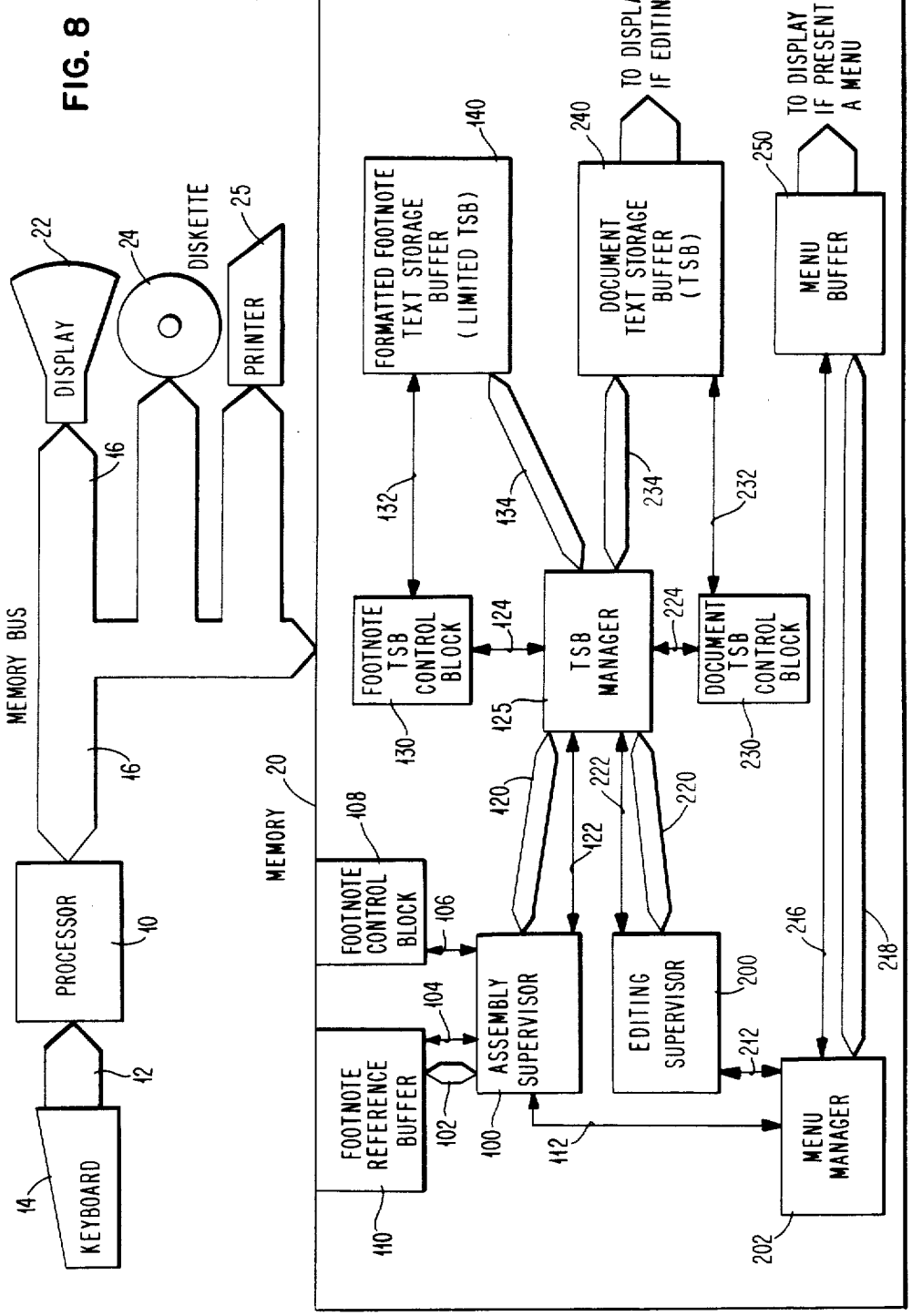
FIG. 8 is a block diagram showing a word processing system used for performing the invention of this application.

Refer next to FIG. 8. In this figure is shown a portion of a text processing system, including a processor 10 to which is connected a bus 12 leading from a keyboard 14. Character data generated by manual actuation of keys on keyboard 14 causes character related signals to be applied to processor 10. Processor 10 provides on an output memory bus 16 a data stream in which the characters selected by actuation of keyboard 14 appear suitably encoded.

Keyboard 14 is made up of a standard set of alpha/numeric graphic keys for keying characters, numbers, punctuation marks, and symbols, and also includes function and format control keys for causing and controlling a carriage return, indent tab, etc. In addition, the keyboard includes a second set of control keys for issuing special control commands to the system. These control keys are for controlling cursor movement, for setting the keyboard into a number of different modes, for use in conjunction with other keys for defining and controlling operations and other functions, etc.

Memory bus 16 extends to a memory unit 20 which is preferably a random access memory, to a display unit 22, to a diskette unit 24, and to a printer 25.

Included within memory unit 20 are two text storage buffers. One is a formatted footnote text storage buffer (TSB) 140 and the other a document TSB 240. The formatted footnote TSB 140 is used only by an assembly supervisor 100 when a limited footnote resolution algorithm is used to resolve and format footnotes at the bottom of a page. The document TSB 240 is used as a window into indefinite length text pages stored on a diskette readable by unit 24. Both assembly supervisor 100 and an editing supervisor 200 use the document TSB 240.

A footnote TSB control block 130 is linked to formatted footnote TSB 140 via a channel 132. A document TSB control block 230 is linked to document TSB 240 via a channel 232.

TSB manager 125 is linked by channels 124 and 224 to footnote TSB control block 130 and document TSB control block 230, respectively.

TSB manager 125 is linked by channels 134 and 234 to formatted footnote TSB 140 and document TSB 240, respectively. Editing supervisor 200 is linked via channels 220 and 222 to TSB manager 125. Editing supervisor 200 contains keystroke processing routines which are invoked based on the key pressed on keyboard 14.

In operation of the system of FIG. 8, a body text encoded data stream applied along memory bus 16 is stored in document TSB 240. In a process of correction and editing the contents of the body text in document TSB 240, selected portions or lines of a page are presented to the operator on display unit 22.

In addition to editing the contents of the body text, editing supervisor 200 may also create and revise footnotes within document TSB 240 in order that footnotes of indefinite length can be supported.

A menu manager 202 is linked via channels 112 and 212 to assembly supervisor 100 and editing supervisor 200, respectively, and is used when a menu is to be displayed. Menu manager 202 is linked via channels 216 and 218 to a menu buffer 250.

Assembly supervisor 100 is linked to TSB manager 125 via channels 120 and 122. Assembly supervisor 100 provides control routines necessary to execute an assembly operation for paginating and merging body text stored in document TSB 240 with formatted footnote text stored either in formatted footnote TSB 140 (if all of the formatted footnote text for the body text page will fit) or on a diskette.

Assembly supervisor 100 is linked to a footnote control block 108 via channel 106. Footnote control block 108 is used to store status information during the assembly operation for resolving and formatting footnotes.

Assembly supervisor 100 is linked to a footnote reference buffer 110 via channels 102 and 104. Footnote reference buffer 110 contains pointers to diskette stored footnote text which has not yet been placed at the bottom of a page or at the end of the document during the assembly operation.

Figure 9:
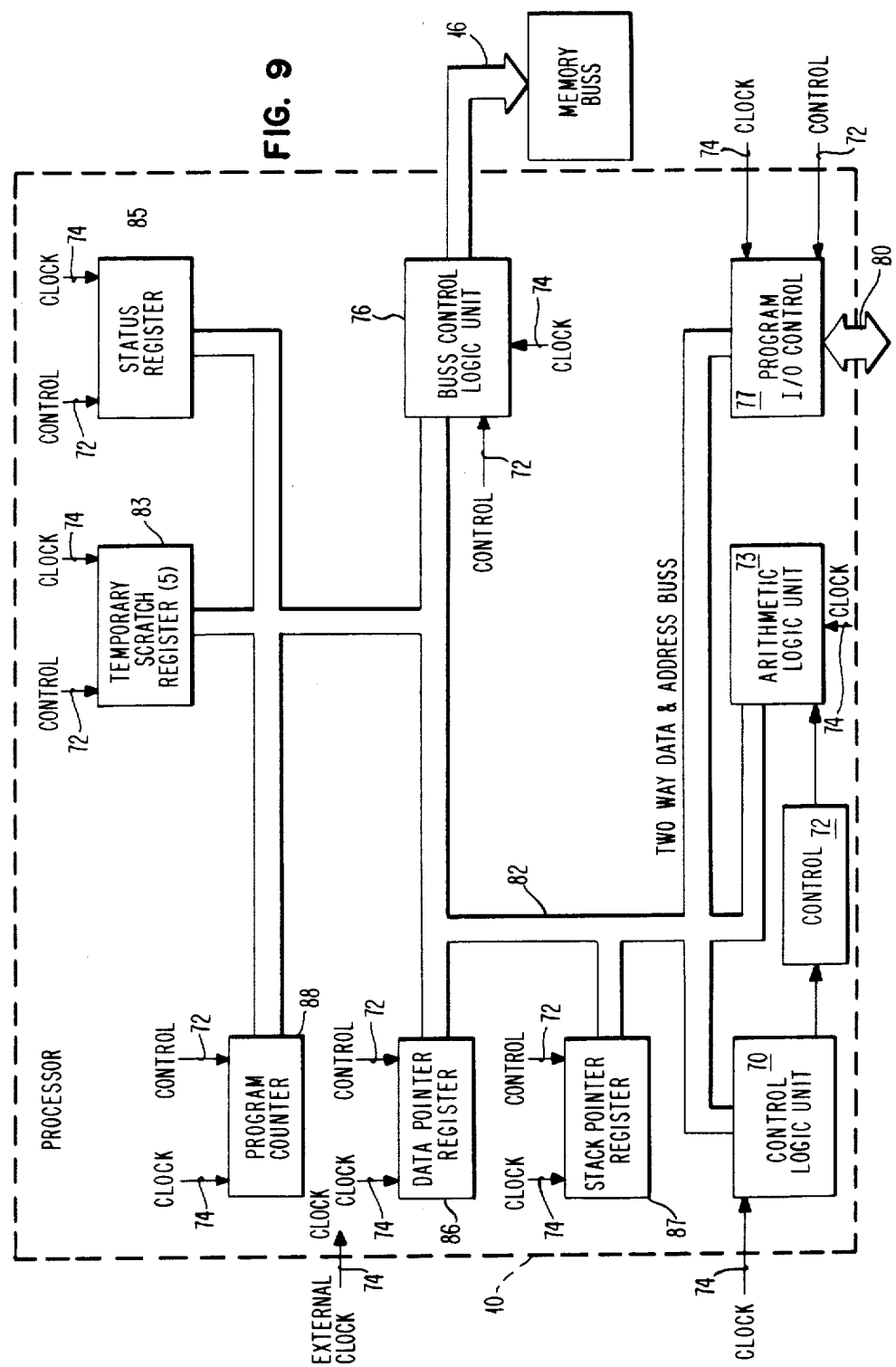
FIG. 9 is a block diagram illustrating the makeup of the processor shown in FIG. 8.

Refer next to FIG. 9. In this figure are shown the details of processor 10 which is capable of performing the operations of this invention under program control. In practice, processor 10 includes an INTEL ® 8086 Microcomputer chip. Typical logic hardware elements forming processor 10 include a control logic unit 70 which responds to instructions from memory 20 on bus 16. The control logic unit 70 is also in the data stream identified by the data and address bus 82 interconnected to various other logic units of processor 10.

In response to instructions from random access memory 20, control logic unit 70 generates control signals to other logic elements of processor 10. These control signals are interconnected to the various elements by means of a control line 72 which is illustrated directly connected to an arithmetic logic unit 73 and identified as a "control" line 72 to other elements of processor 10. Synchronous operation of the control unit 70 with other logic elements of processor 10 is achieved by means of clock pulses input to processor 10 from an external clock source on bus 74. This bus is also shown interconnected to various other logic elements of processor 10.

Data to be processed in processor 10 is input either through a bus control logic unit 76 or a program input/output control logic unit 77. The bus control logic 76 connects to random access memory 20 and receives instructions for processing data input to input/output control 77. Thus, input/output control 77 receives data from keyboard 14 while bus control logic 76 receives instructions from memory 20. Note that different storage sections of memory 20 are identifiable for instruction storage and data storage. Device controls from processor 10 are output through program input/output controller 77 over a data bus 80.

Input data on the data bus 16 is passed internally through processor 10 on the bus 82 to control unit 70. Arithmetic logic unit 73, in response to a control signal on line 72 and in accordance with instructions received on memory bus 16, performs arithmetic computations which may be stored in temporary scratch registers 83. Various other transfers of data between the arithmetic logic unit 73 and other logic elements of processor 10 are of course possible. Such additional transfers may be to a status register 85, data pointer register 86 or a stack pointer register 87. Also in the data stream for these various logic elements by means of the bus 82 is a program counter 88.

A particular operating sequence for processor 10 is determined by instructions on bus 16 and input data on the bus 16 or on bus 80 from keyboard 14. As an example, in response to received instructions, processor 10 transfers data stored in scratch registers 83 to one of registers 86, 87, or 85. Such operations of processors as detailed in FIG. 9 are considered to be well known and understood by one of ordinary skill in the data processing field. A detailed description of each of the operations of the processor of FIG. 9 for the described invention would be counterproductive to an understanding of the invention as claimed.

Table 1 illustrates a routine used by processor 10 for soliciting operator input of footnote formatting information.

Figure 10:
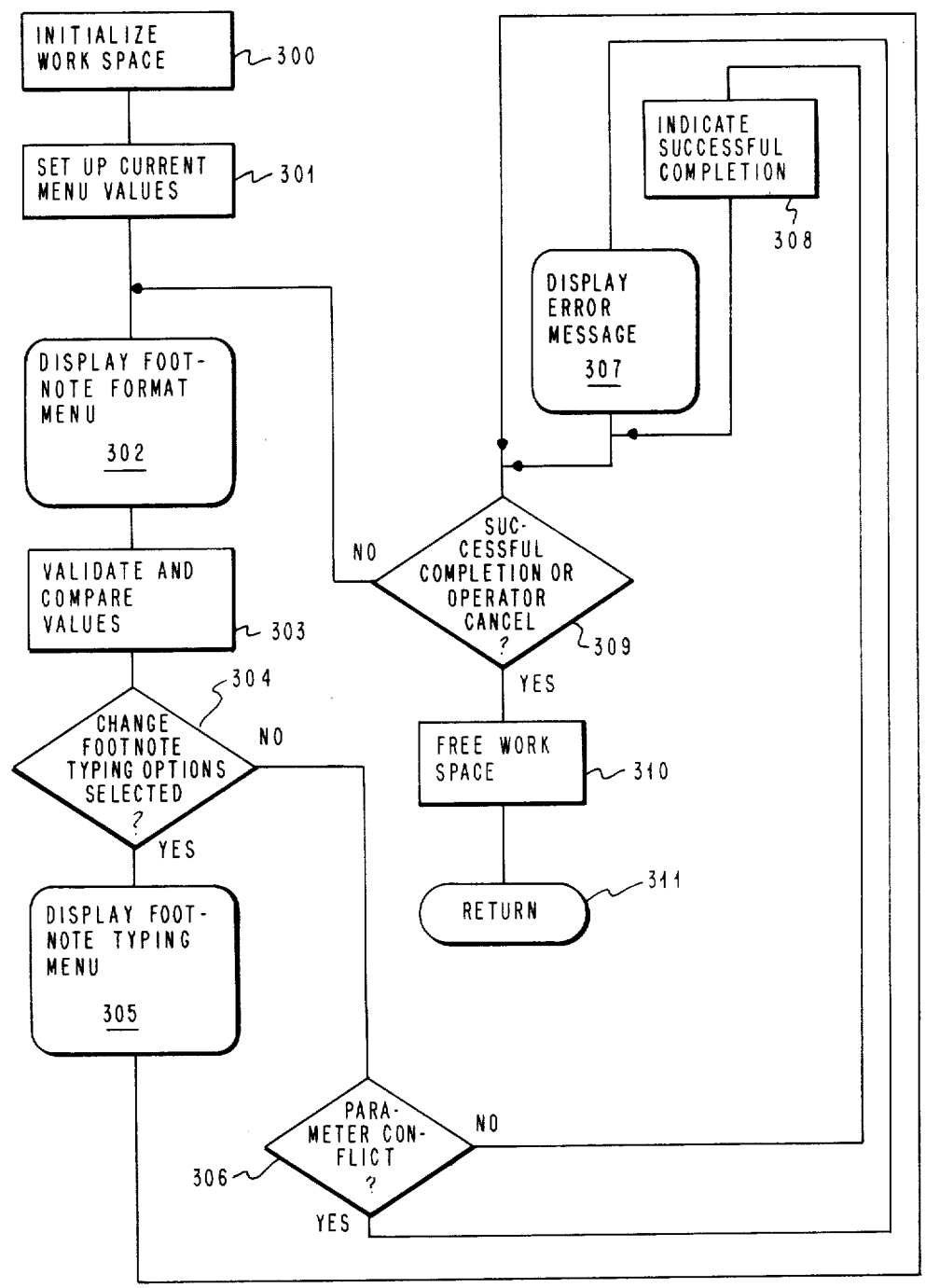

Table 1 is also shown in flow chart form in FIG. 10. The numbers in parenthesis in Table 1 correspond to the reference numerals in FIG. 10.

TABLE 1

FOOTNOTE FORMAT ROUTINE
BEGIN (FN FMT)
INITIALIZE WORK SPACE AND CONTROL BLOCKS (300)
COPY CURRENT VALUE OF ALL MENU OPTIONS (301)
INITIALIZE DFD (DYNAMIC FRAME DESCRIPTOR)
WITH MENU OPTION VALUES
UNTIL MENU IS SUCCESSFULLY EXITED OR CANCELLED DO (309)
DISPLAY FOOTNOTE FORMAT MENU UNTIL MENU MANAGER (302)
RETURNS
VALIDATE/COMPARE VALUES (303)
IF THE "CHANGE FOOTNOTE TYPING OPTIONS" DIRECTIVE OPTION WAS SELECTED THEN (304)
DISPLAY FOOTNOTE TYPING OPTIONS MENU AND SAVE (305)
OPERATOR INPUT FOR LEADING/TRAILING CHARACTERS AND "FOOTNOTE CONTINUED" TEXT
ELSE
IF A PARAMETER CONFLICT EXISTS THEN (306)
POST OPERATOR MESSAGE (307)
ELSE
INDICATE FOOTNOTE FORMAT MENU HAS SUCCESSFULLY EXITED (308)
ENDIF
ENDIF
ENDDO
FREE WORK SPACE (310)
RETURN (311)
END TABLE 1 (FN FMT)

FOOTNOTE FORMAT

If a "Change Footnote Format" option is selected in a Format Selection menu presented to the operator for any number of tasks, then the system displays a Footnote Format menu as shown in MENU 1 below.

The Footnote Format is a part of both the Document and Alternate Document Format of the document. The Document and Alternate Document Format are two independent sets of formats which the operator may begin using at the top of any page in the document. Unless specified otherwise, the system defaults to the Document Format.

| MENU | | | |
|---|---|---|---|
| Chg Document Fmt DSK001 | Brief | Ins Kyb 1 Pitch 12 | |
| FOOTNOTE FORMAT | | | |
| ID | ITEM | YOUR CHOICE | POSSIBLE CHOICES |
| a | Typestyle Number | | 1–31 (10 Pitch) 80–111 (12 Pitch) 154–175 (Proportional) 215–230 (15 Pitch) |
| b | Separator Character | — | Any available character |
| c | Number of Separator Characters | 20 | 1–450 |
| d | Maximum Number of Footnote Text Lines Per Page | 48 | 1–999 |
| e | Number of Lines Between Footnotes | 0 | 0–999 |
| f | Footnote Numbering | 1 | 1 = Document 2 = Page |
| g | Footnote Numbering Graphic | | Any available character, or none |
| h | Footnote Placement | 2 | 1 = Document 2 = Page |
| i | Change Footnote Typing Options | | |

When Finished with this menu, press ENTER.
Type ID letter to choose item; press ENTER:

Each ITEM in MENU 1 is briefly described below.

Typestyle Number: A plurality of choices of fonts including a variety of typestyles and pitches are available from MENU 1. Both typestyle and pitch are determined by a Font ID selected by the operator from POSSIBLE CHOICES. If no ID is specified, the system will use a Line Format typestyle default value.

Separator Character: Any graphic character available on a selected font can be specified or selected by the operator to form a separator line separating body and footnote text.

Number of Separator Characters: The operator can specify the number of characters to be used in making up the separator line. The number will only be measure limited. It is to be noted that a blank line will always precede and follow the separator line.

Maximum Number of Footnote Text Lines per Page: The number specified by the operator will be the maximum number of lines available at the bottom of the page for footnote text. Included with this number will be a specified number of lines between footnotes. Not included in the specified number are the blank lines before and following the separator line, the separator line, and a dedicated line at the bottom of the page. Although not included in the maximum number of footnote text lines, these lines are included in the total page line count.

Number of Lines Between Footnotes: The operator can specify the interfootnote line spacing for formatting purposes to improve aesthetics. Footnote text will always be single spaced.

Footnote Numbering: An operator can specify whether or not footnote numbering is to be reset at page boundaries.

Footnote Numbering Graphic: If footnote numbering is to be reset at page boundaries and a non-numeric graphic character such as an asterisk is specified, the first footnote will be numbered "*", the second will be numbered "**", etc.

Footnote Placement: The operator can specify whether or not footnotes are formatted and placed at the bottom of each page or the end of the document. Range: 1=Yes; 2=No Following selections from MENU 1 and depression of the ENTER key, a Footnote Typing Options Format menu will be presented to the operator. This is illustrated below as MENU 2 wherein choices are available for the fixed portion of both footnote and footnote reference designations. The type of the variable portions of the footnote and footnote reference designations is selected from MENU 1.

| MENU 2 | | | |
|---|---|---|---|
| Chg Document Fmt DSK001 | Brief | Ins Kyb 1 | Pitch 12 |
| FOOTNOTE TYPING OPTIONS | | | |
| ID | ITEM | YOUR CHOICE | POSSIBLE CHOICES |
| | For Body Text: | | |
| a | Leading Characters | "½ INX UP" | Up to 8 characters, or none |
| b | Trailing Characters | "½ INX DOWN" | Up to 8 characters, or none |
| | For Footnote Text: | | |
| c | Leading Characters | "½ INX UP" | Up to 8 characters, or none |
| d | Trailing Characters | "½ INX DOWN" | Up to 8 characters, or none |
| e | 'Continued Footnote' Message Characters | (Footnote Conitnued) | |
| When finished with this menu, press ENTER. Type ID letter to choose ITEM; press ENTER: | | | |

An explanation of each ITEM listed in MENU 2 is set out below.

Leading Characters: These characters include both controls and graphics to be generated by the system immediately before the variable portion of the footnote and footnote reference designation both in body and footnote text.

Trailing Characters: These characters include both controls and graphics to be generated by the system immediately after the variable portion of the footnote and footnote reference designation both in body and footnote text.

'Continued Footnote' Message Characters: Any character, tab, indent tab, space, required space, required backspace, or word underscore can be selected for system placement (1) following the last footnote line on a page, and (2) before the first footnote line on the next page when a footnote "spills over" from one page to the next.

When the operator completes entry of all desired choices and depresses the Enter key against a prompt to type the ID to choose an item displayed on the Prompt Line, the system will update the Document or Alternate Format of the document with the values selected by the operator and re-display the Format Selection menu.

Following the above set up routine, the operator is now ready to begin preparing a footnoted document. Footnotes are created during the normal Create/Revise Document task via a Footnote instruction. When the operator selects "Footnote" from an Instruction Menu and depresses the Enter key, a Footnote Menu illustrated below as MENU 3 will be presented.

| MENU 3 | | | |
|---|---|---|---|
| Create Document DISK01 | Brief Pg. 1 | Ins Ln. 13 | Kyb 1 |
| FOOTNOTE | | | |
| ID | ITEM | YOUR CHOICE | POSSIBLE CHOICES |
| a | Create/Revise Footnote Text | 1 | 1 = Yes 2 = No |
| b | Reset Footnote Number or Character | | |
| c | Document Name | | |
| d | Diskette Name | | |
| e | System Page Number | | |
| When finished with this menu, press ENTER. Type ID letter to choose ITEM; press ENTER: | | | |

The ITEMS against which the operator makes choices are described below.

Create or Revise Footnote Text: Operator selection here is for calling a blank Footnote Typing Frame illustrated as FRAME 1 later herein if typing a new footnote is in order, or a Footnote Typing Frame with an existing footnote as illustrated in FRAME 2 later herein in order for the operator to make revisions.

Reset Footnote Number of Character: This option is selected whenever the operator desires to override the automatic system-generated sequence of footnote numbering or designations (i.e., 1, 2, 3, ...) by specifying a specific number or other graphic character or characters.

If a number is entered, then footnote numbering by the system will be reset to that value. If a graphic is entered, then the automatic sequencing of numeric values will be suspended until the next "null" or numeric value is encountered.

The following two items should only be selected if footnotes are to be stored in a document other than the editing document.

Document Name: Selection here is to (1) store footnote text to be created, (2) locate footnote text to be revised, or (3) locate existing footnote text to be included in the document.

Diskette Name: The name of the diskette on which the above document resides is entered by the operator.

System Page Number: An entry here is for calling a page which contains the footnote text. If both the Document Name and Diskette Name are blank, then the system will assume that footnote text is to be stored with the document being created or edited. The system will store the footnote text on the next available page on or above 9000 (i.e., 9000, 9000.0.1, 9000.0.2, ...) and after existing footnote pages.

If the operator specifies another Document Name/Diskette Name, then any page number of that document may be used to store the footnote text. If no page number is specified, then the first available page will be used. The operator may also specify that a particular existing page number be used by selecting this ITEM and entering the page number.

The Footnote Instruction thus created in memory will have the following makeup:

(1) Footnote Reference Control (FTR) followed by the following controls:
(2) Begin Formatted Text Control (BFT)
(3) Leading characters
(4) Footnote number
(5) Trailing characters
(6) End Formatted Text Control (EFT)

The BFT/EFT control pair is used by the system to identify data that was generated by the system and may be later updated or modified by the system.

The value of the footnote number itself may be:

(1) Sequentially assigned by the system when the footnote instruction is created (and prior to assembly for merging and paginating the footnote and body text).
(2) Explicity assigned by the operator when the footnote instruction is created.
(3) Determined by the system during the assembly operation.

As a result, a footnote number (together with any leading and/or trailing characters) will always appear in the body text after a footnote instruction is created.

Upon revising a footnote instruction, the Footnote Instruction can be altered by placing the cursor on the Footnote Instruction and pressing the Enter key. The Footnote Menu (MENU 3) will be recalled.

During creation or revision of footnote text, if "Create or Revise Footnote Text" is set to "Yes" in the Footnote Menu (MENU 3), a Footnote Typing Frame (Frames 1 and 2) will be displayed when the ENTER key is depressed.

| FRAME 1 | | |
|---|---|---|
| (Footnote Typing Frame - Create) | | |
| Create Footnote | Brief | Ins |
| DISK01 | Pg. 1 | Ln.13  Kyb 1  Pitch 12 |
| When finished, press ENTER. | | |
| FRAME 2 | | |
| (Footnote Typing Frame - Revise) | | |
| Revise Footnote | | |
| DISK01 | | |
| J. J. Vreeland, What to Look for When You Review Programming Documents for Product Usability, Technical Report TR03.124 (December, 1980); may be obtained from the IBM Corporation, Santa Teresa Laboratory, 555 Bailey Avenue, P.O. Box 50020, San Jose, CA 95150. | | |
| When finished, press ENTER. | | |

The format of the footnote text and the page presentation characteristics for footnotes are determined by the Document or Alternate Format and the Footnote Format. After the footnote and body text have been assembled, the footnote text will always be single spaced regardless of the line spacing of the body text. The Context Field on the First Status Line of the Footnote Typing Frames will display either "Create Footnote" or "Revise Footnote", as appropriate.

In order to create a reference to an already existing footnote, operator procedure is to specify the diskette name, document name, and page number for the footnote and set "Create or Revise Footnote Text" to "No" in the Footnote Menu (MENU 3). After the operator has specified the document name and diskette name the first time a footnote was included, the default will be the previous document and diskette name used.

During document assembly, body text and footnote text are resolved. Resolution requires combined pagination and merge operations if both body and footnote text are to appear on the same page.

Footnote text is formatted for output to a display for review or to a printer by either a Paginate Document task, a Merge task, or a Paginate/Hyphenate option of a Check Document task. The Paginate Document task will assemble the document to permit the operator to view the pages of the document made up of body and footnote text exactly as it will be printed.

The makeup of the footnote text at the bottom of the page will be:

Begin Formatted Text Control (BFT)
Line Format Change (to set footnote format)
Begin Keep Control
Required Carrier Return (for blank line above separator line)
Separator line, Required Carrier Return
Required Carrier Return (for blank line below separator line)
Footnote Text
Line Format Change (to return to format prior to footnote)
"n" number of indent tabs (where "n" is determined from the indent level at the Begin Formatted Text control).
End Keep Control
End Formatted Text Control (EFT)

The footnote reference number or other designation in the body text will be used to determine the footnote number or other designation to be printed and displayed. The system will automatically insert footnote designations together with any leading and trailing characters at the beginning of the footnotes automatically during assembly only.

Ordinarily, the system will assign footnote numbers in sequential order. However, if the operator has specified that a particular number be used, the system will assign that number to the footnote, and subsequent system assigned numbers will be determined using that number as a base.

Automatic sequencing may be interrupted by the presence of non-numeric footnote reference designations. The next numeric footnote reference will resume the automatic sequencing by the system.

If footnotes are inserted, moved, or deleted from the assembled document, then the document must be reassembled to renumber the footnotes.

Table 2 describes the routine performed by the assembly supervisor 100. This is the main routine that controls the pagination and merge operations. This main routine (DOCPA) invokes other routines to adjust lines, make page ending decisions, and process, format, and renumber footnotes.

Figure 11A:
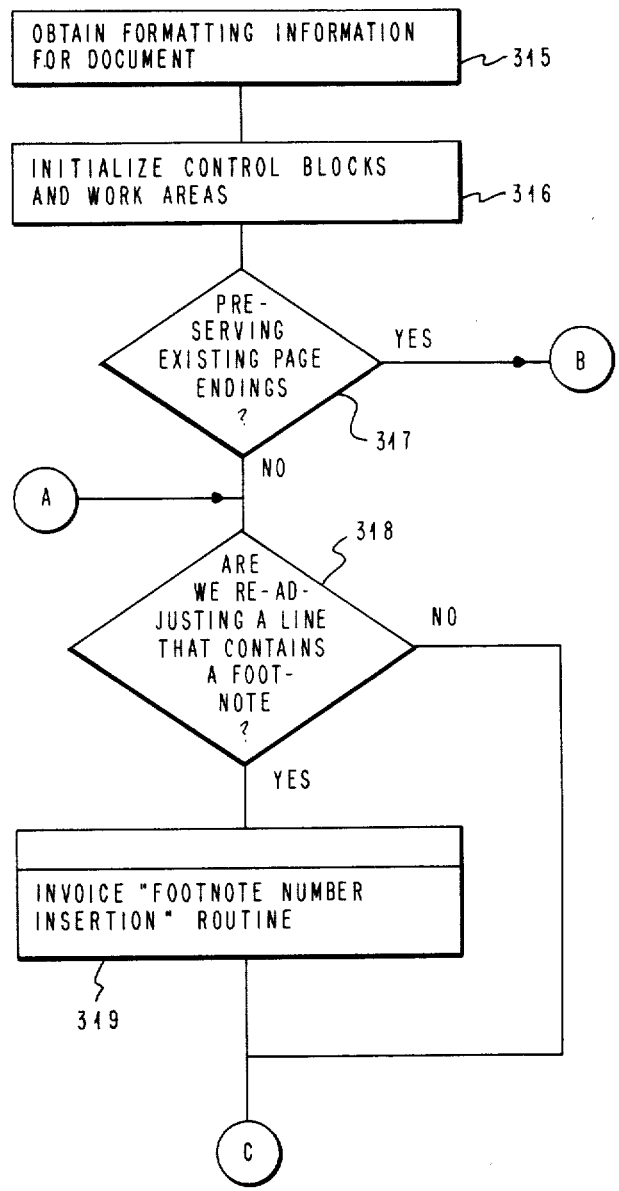
Figure 11B:
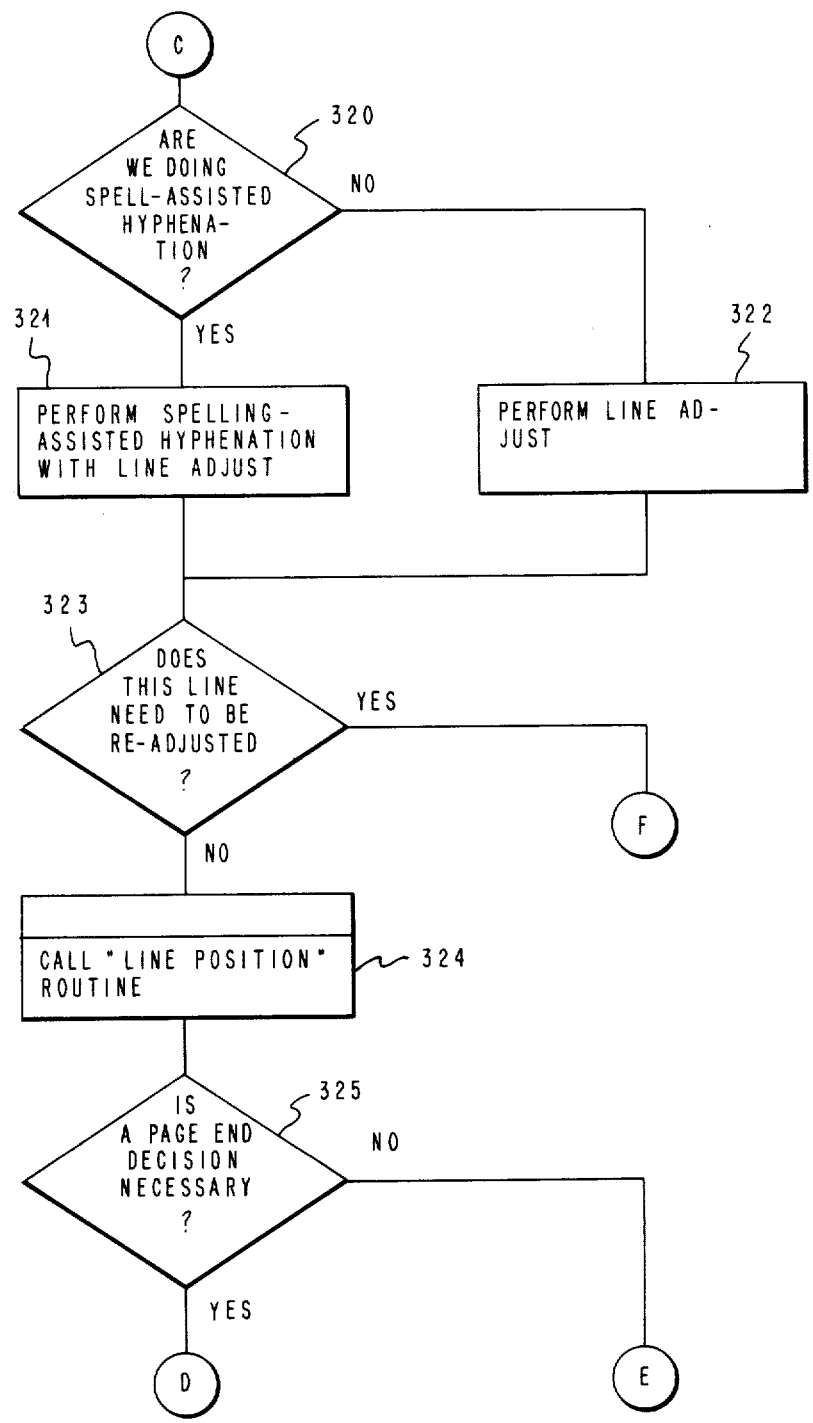
Figure 11C:
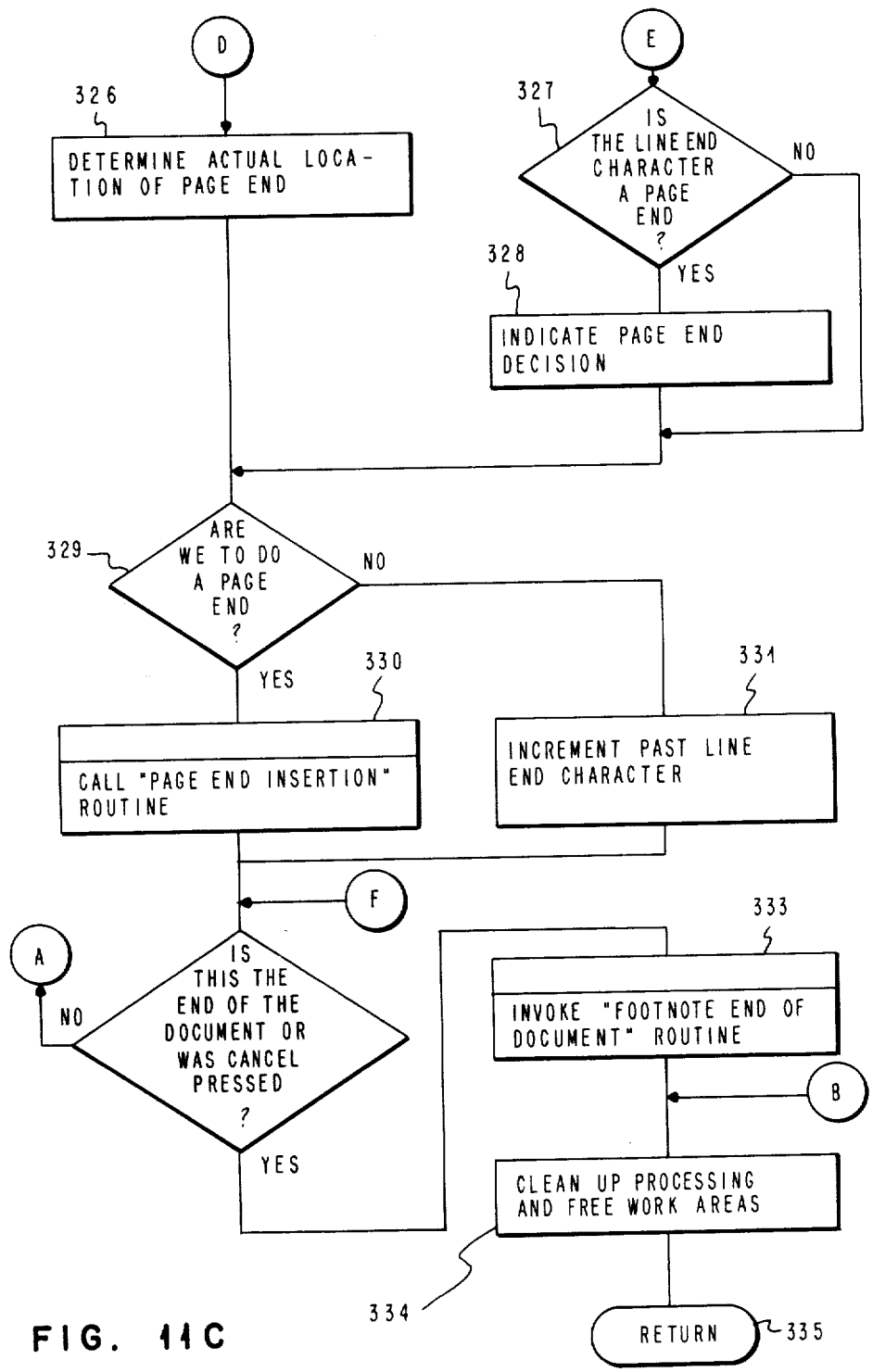

Table 2 is also shown in flow chart form in FIG. 11. The numbers in parenthesis in Table 2 correspond to the reference numerals in FIG. 11.

TABLE 2

BEGIN (DOCPA)
OBTAIN FORMATTING INFORMATION FOR DOCUMENT (315)
INITIALIZE CONTROL BLOCKS AND WORK AREAS (316)
GO TO STARTING PAGE
IF PRESERVE PAGE ENDINGS IS NOT INDICATED THEN (317)
UNTIL END OF DOCUMENT OR CANCEL PRESSED DO
IF READJUSTING LINE AND A FOOTNOTE WAS (318) ENCOUNTERED ON THAT LINE THEN
INVOKE (FNNUM) - UPDATE/INSERT FOOTNOTE (319)

TABLE 2-continued

```
NUMBER IN BODY TEXT
ENDIF
IF SPELL-ASSISTED HYPHENATION IS ON THEN (320)
PERFORM SPELLING-ASSISTED HYPHENATION WITH
LINE ADJUST (321)
ELSE
PERFORM LINE ADJUST (322)
ENDIF
IF THE LINE IS NOT TO BE READJUSTED THEN (323)
CALL (LINEPOS) TO DETERMINE IF LINE POSITION (324)
CAUSES A PAGE END DECISION
IF PAGE END DECISION THEN (325)
DETERMINE LOCATION OF PAGE END (326)
ELSE
IF LINE END CODE IS A PE OR RPE THEN (327)
INDICATE PAGE END DECISION (328)
ENDIF
ENDIF
IF PAGE END DECISION THEN (329)
CALL (PAGEEND) TO INSERT A PAGE END AND (330)
INCREMENT THE POINT OF OPERATION TO NEXT
PAGE
ELSE
INCREMENT PAST LINE END CODE (331)
ENDIF
ENDIF
ENDDO
INVOKE (EDOC) - FOOTNOTE END OF DOCUMENT (333)
PROCESSOR
ENDIF
CLEANUP AFTER TERMINATING PAGINATE
CLEANUP FOOTNOTE PROCESSING
FREE WORK AREAS (334)
END TABLE 2 (DOCPA) RETURN TO CALLER (335)
```

Table 3 describes a subroutine (LINEPOS) of the routine DOCPA. This subroutine calculates the positional change caused by line ending codes. The paginator (DOCPA) uses this information in determining where to make page ending decisions. The subroutine (LINEPOS) also invokes a routine (RSOLVE) to fetch and resolve footnote text.

Figure 12:
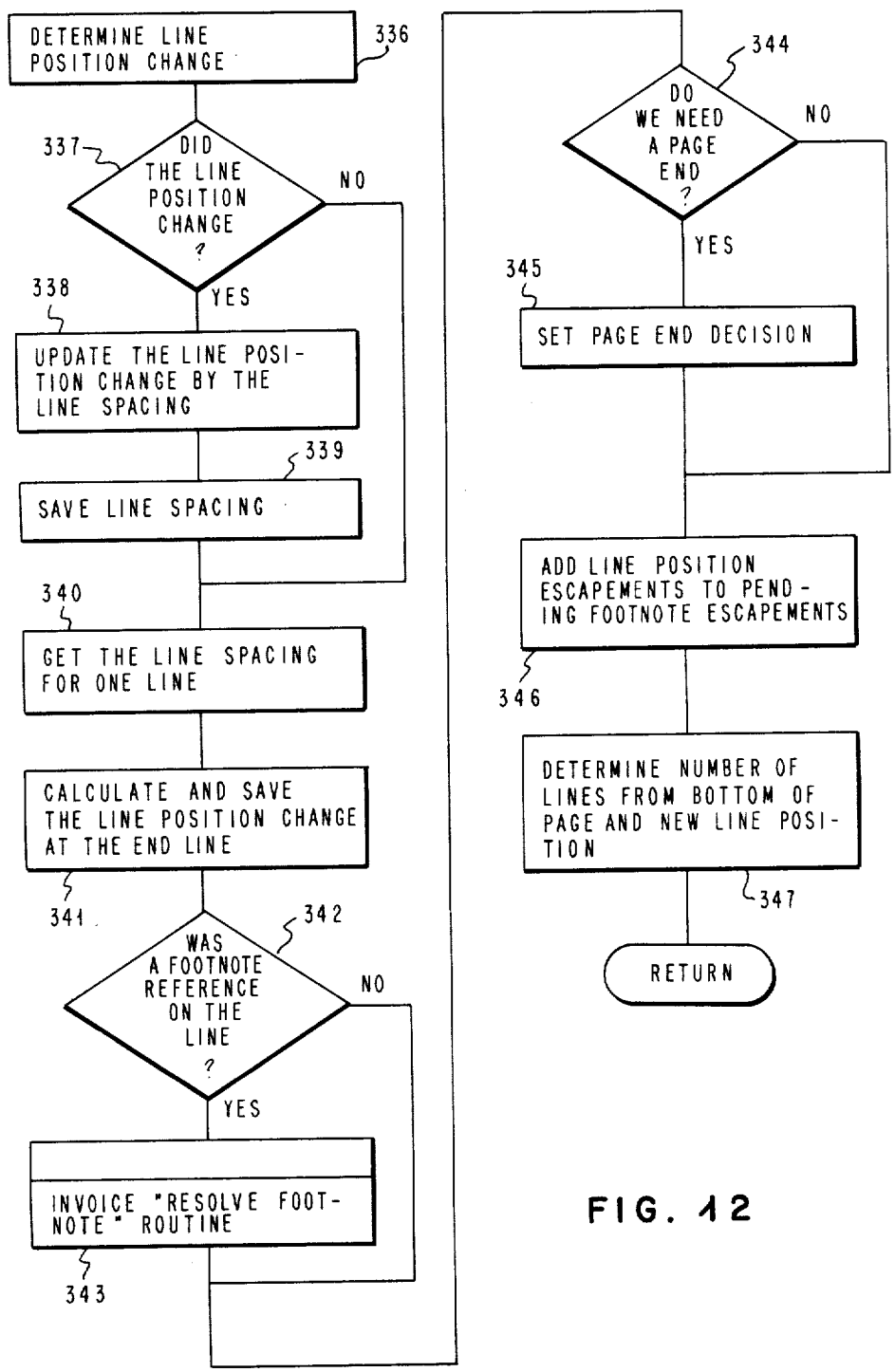

Table 3 is also shown in flow chart form in FIG. 12. The numbers in parenthesis in Table 3 correspond to the reference numerals in FIG. 12.

TABLE 3

```
BGNPROC (LINEPOS)
DETERMINE LINE POSITION CHANGE (336)
IF THE LINE END CAUSES THE LINE POSITION TO
CHANGE (337)
THEN UPDATE THE LINE POSITION CHANGE
BY THE LINE (338)
SPACING
SAVE LINE SPACING (339)
ENDIF
OBTAIN THE LINE DENSITY FOR 1 LINE (340)
SAVE THE LINE DENSITY FOR THE LINE SPACING
CALCULATE AND SAVE THE LINE POSITION CHANGE
AT THE END OF THE LINE (341)
IF A FOOTNOTE REFERENCE WAS ENCOUNTERED ON
THE (342)
LINE THEN
INVOKE (RSOLVE) - RESOLVE FOOTNOTE INTO THE
FOOTNOTE BUFFER (343)
ENDIF
IF FOOTNOTE ROUTINE WANTS PAGE END DECI-
SION THEN (344)
SET PAGE END DECISION (345)
ENDIF
ADD LINE POSITION ESCAPEMENTS TO PENDING
FOOTNOTE
ESCAPEMENTS (346)
DETERMINE NUMBER OF LINES FROM BOTTOM OF
PAGE
DETERMINE NEW LINE POSITION (347)
ENDPROC TABLE 3 LINEPOS
```

Table 4 describes a subroutine (PAGEEND) of the routine DOCPA that makes page ending decisions by inserting a page end code into the document TSB 240. Prior to inserting the page end code, the subroutine (PAGEEND) invokes a routine (EPAG) to process and insert all footnote text accumulated in the formatted footnote TSB 140 or stored on diskette unit 24 into document TSB 240.

Figure 13:
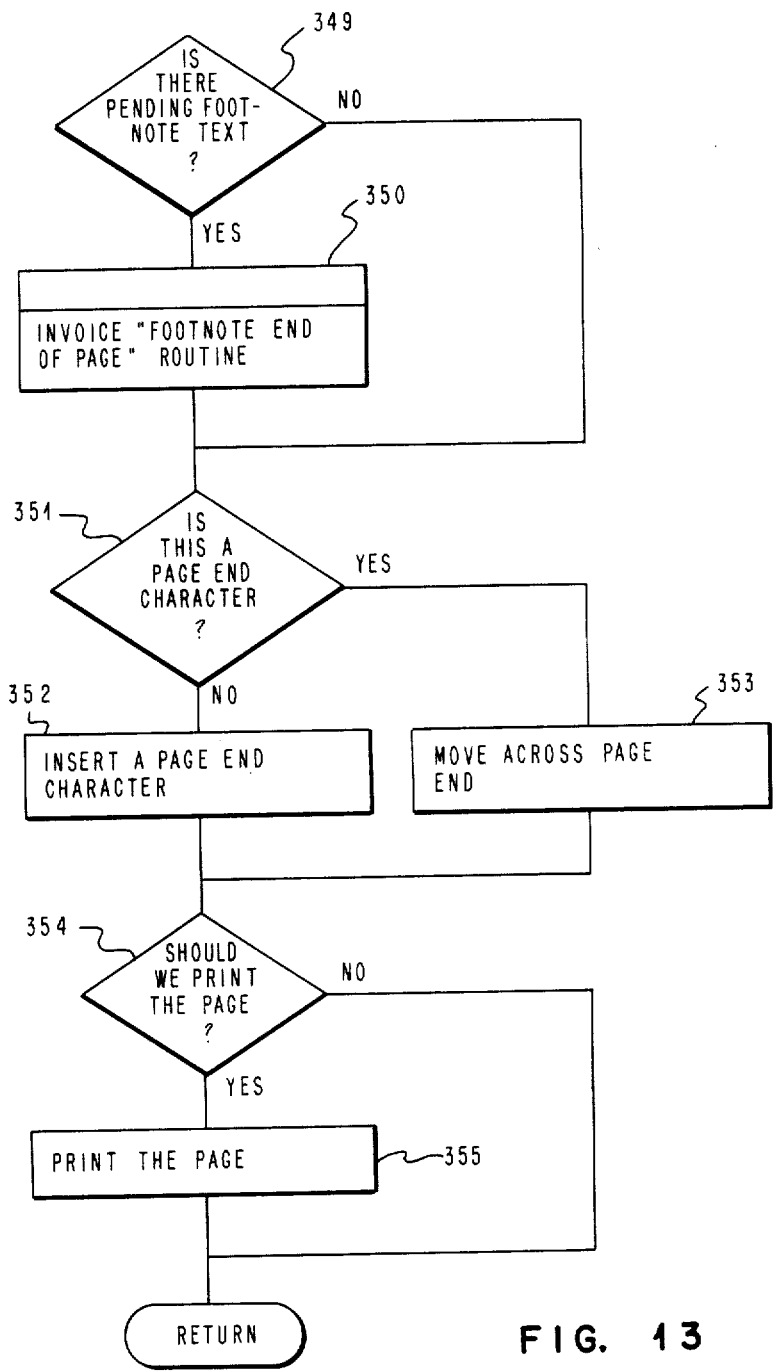

Table 4 is also shown in flow chart form in FIG. 13. The numbers in parenthesis in Table 4 correspond to the reference numerals in FIG. 13.

TABLE 4

```
BGNPROC PAGEEND
IF THERE IS PENDING FOOTNOTE TEXT THEN (349)
INVOKE (EPAG) - FOOTNOTE END OF PAGE
PROCESSOR (350
ENDIF
IF NOT A PAGE END CODE THEN (351)
INSERT THE PAGE END CODE (352)
ELSE
MOVE ACROSS PAGE END (353)
EXIT IF END OF TEXT PAGES
MOVE TO START OF TEXT ON NEXT PAGE
ENDIF
IF PRINT INDICATED THEN (354)
PRINT PAGE (355)
ENDIF
ENDPROC TABLE 4 PAGEEND
```

Table 5 describes the routine (FNNUM) which determines the type of footnote numbering or designations to be used and when to reset and/or increment the numbering or designations.

Figure 14:
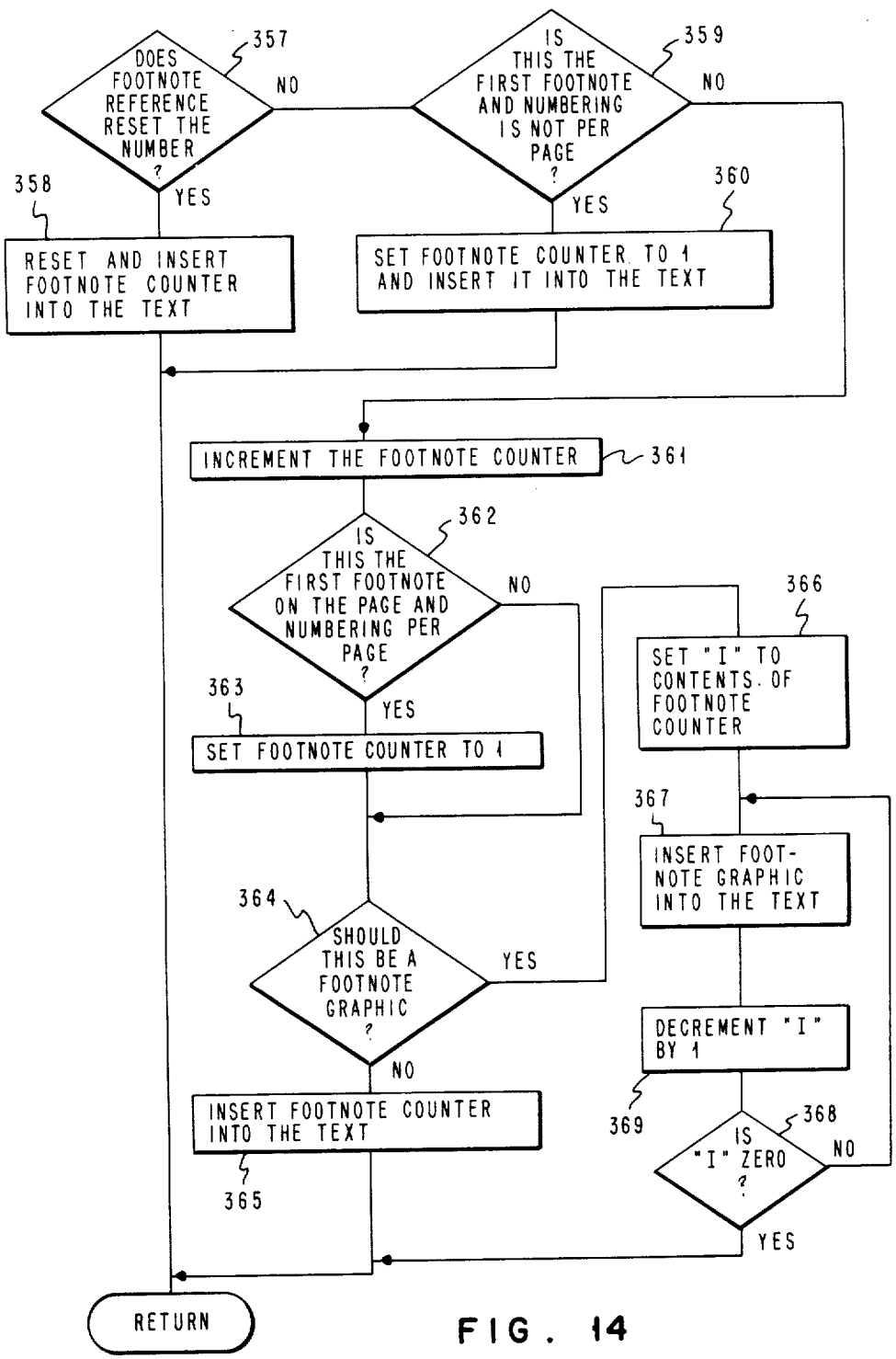

Table 5 is also shown in flow chart form in FIG. 14. The numbers in parenthesis in Table 5 correspond to the reference numerals in FIG. 14.

TABLE 5

```
BEGIN (FNNUM)
IF FOOTNOTE REFERENCE RESETS THE
FOOTNOTE (357) NUMBERING
THEN
RESET THE FOOTNOTE COUNTER TO THE SPECIFIED
VALUE
INSERT THE COUNTER INTO THE BODY TEXT (358)
ELSE
IF THIS IS THE FIRST FOOTNOTE OF THE
DOCUMENT AND NUMBERING IS NOT BEING DONE
ON A PER PAGE BASIS (359)
THEN
SET THE FOOTNOTE COUNTER TO 1
INSERT THE COUNTER INTO THE BODY TEXT (360)
ELSE
INCREMENT THE FOOTNOTE COUNTER (361)
IF THIS IS THE FIRST FOOTNOTE OF A PAGE AND
NUMBERING IS BEING DONE ON A PER PAGE BASIS
THEN (362)
SET THE FOOTNOTE COUNTER TO 1 (363)
ENDIF
IF FOOTNOTE GRAPHIC NUMBER IS NOT SPECIFIED
THEN (364)
INSERT THE COUNTER INTO THE BODY TEXT (365)
ELSE
SET I = FOOTNOTE COUNTER (366)
DO UNTIL I = (368)
INSERT FOOTNOTE GRAPHIC (367)
I = I−1 (369)
ENDDO
ENDIF
ENDIF
ENDIF
END TABLE 5 (FNNUM)
```

The routine RSOLVE in Table 6 is invoked by the paginator routine (DOCPA) if the footnote placement is specified to be "bottom of page" not "bottom of document". If the footnote placement is specified to be "bottom of document", then resolution occurs in the routine EDOC. Its function is to resolve one or more footnote reference controls that the paginator encountered after adjusting the cursored body text line during document pagination. Note that the paginator (DOCPA) invokes this routine only after completing the line adjustment of the cursored line and additionally determining that the cursored line will fit on the current page. This routine:

(a) insures that the footnote format values are in a range that will enable feasible resolution. These include the maximum number of footnote text lines, and the number of blank lines between footnotes, (b) determines whether the current page is to be terminated prematurely. This occurs when the first footnote text line for the footnote reference that is being processed will not appear on the same page as its reference. This usually occurs when there is enough footnote text pending such that the maximum number of footnote text lines is surpassed, (c) resolves the footnote references encountered on the current line via the invocation of routine GETFN to fetch and resolve each footnote reference.

Figure 15:
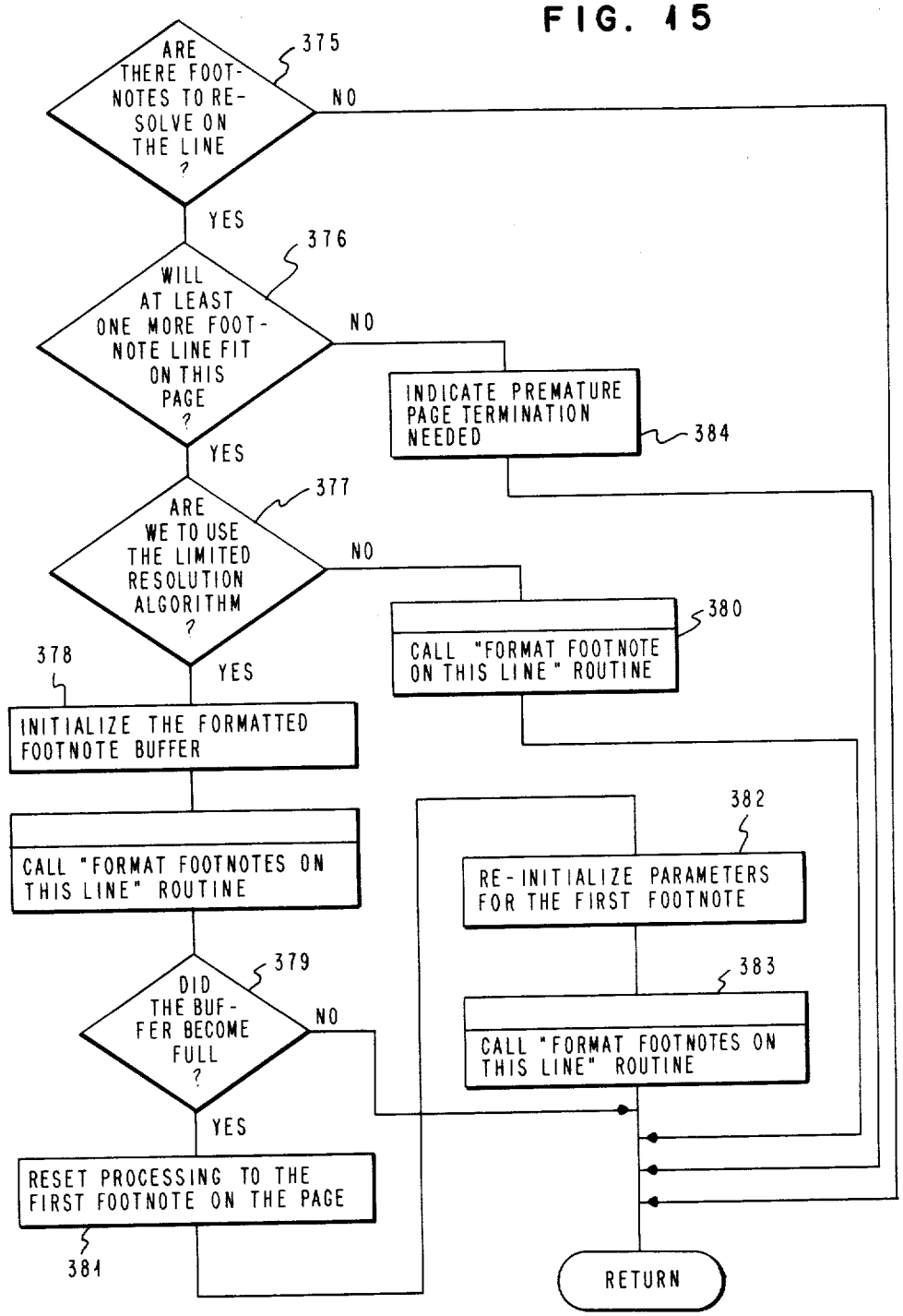
Figure 46B:
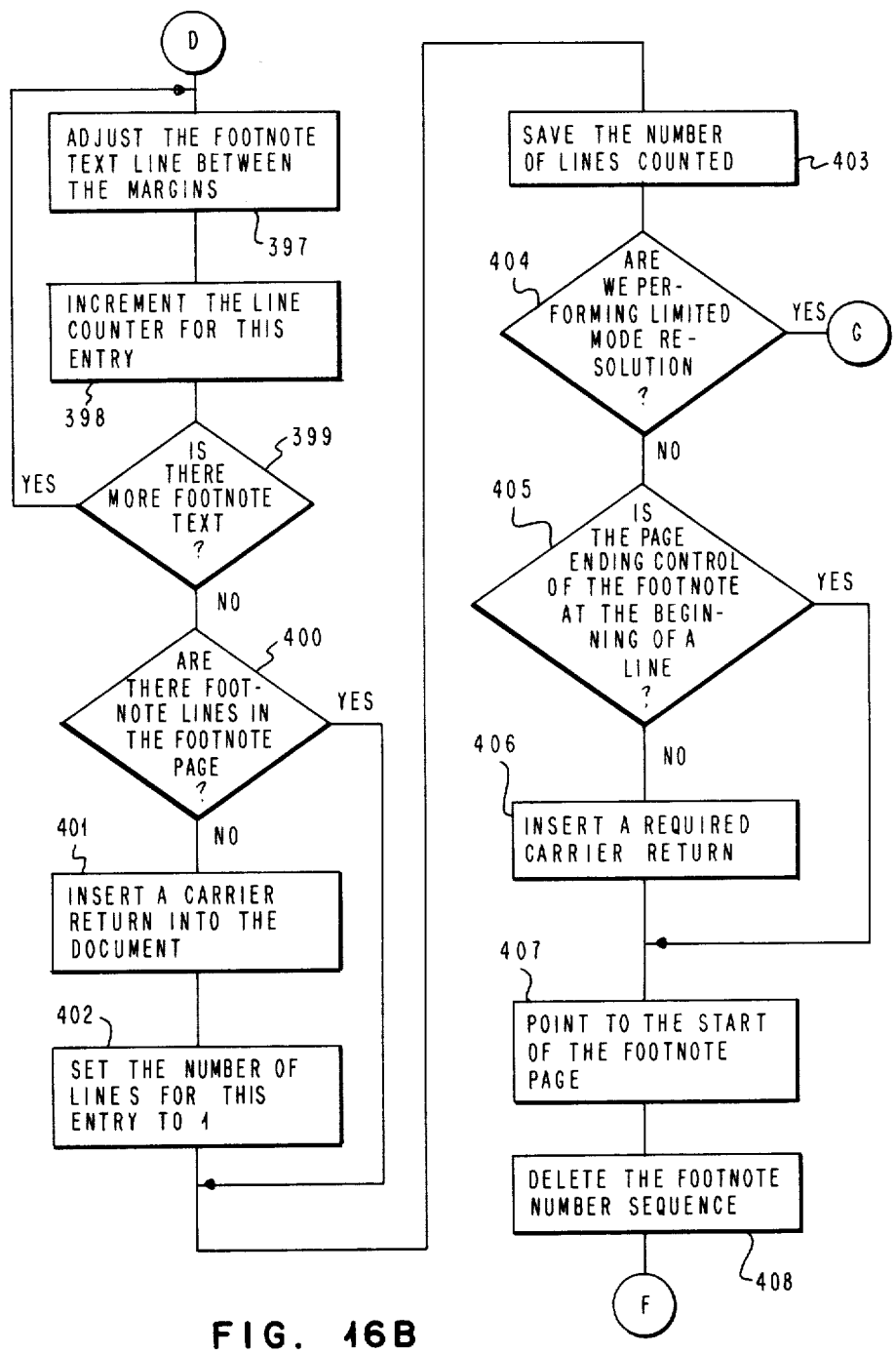

Table 6 is also shown in flow chart form in FIG. 15. The numbers in parenthesis in Table 6 correspond to the reference numerals in FIG. 15.

TABLE 6

```
BEGIN (RSOLVE)
IF THERE ARE FOOTNOTES TO RESOLVE FOR
THE CURRENT (375)
LINE THEN
IF AT LEAST ONE MORE FOOTNOTE TEXT
LINE WILL FIT
AT THE BOTTOM OF THE CURRENT PAGE BEING
PAGINATED THEN (376)
IF THE RESOLUTION ALGORITHM TO BE
USED IS THE
LIMITED TSB ALGORITHM THEN (377)
INITIALIZE THE FORMATTED FOOTNOTE
LIMITED TSB (378)
INVOKE GETFN - RESOLVE/FORMAT FOOTNOTES ON
THIS LINE (380)
IF THE FORMATTED FOOTNOTE LIMITED
TSB BECAME
FULL THEN (379)
RESTORE POINT OF OPERATION TO THE FIRST
FOOTNOTE OF THIS PAGE (381)
RE-INITIALIZE PARAMETERS FOR THE FIRST
FOOTNOTE OF THIS PAGE (382)
INVOKE GETFN - RESOLVE/FORMAT FOOT-
NOTES ON THIS LINE USING INDEFINITE LENGTH
ALGORITHM (383)
ENDIF
ELSE
INVOKE GETFN - RESOLVE/FORMAT FOOT-
NOTES ON THIS LINE USING THE INDEFINITE LENGTH
ALGORITHM
ENDIF
ELSE
INDICATE PREMATURE PAGE TERMINATION
DUE TO INSUFFICIENT ROOM AT THE BOTTOM OF
THE PAGE FOR ONE MORE FOOTNOTE TEXT LINE (384)
ENDIF
ENDIF
RETURN
END TABLE 6 (RSOLVE)
```

The routine GETFN in Table 7 is invoked by the routine RSOLVE to perform the actual resolution of footnote references. Its function is to resolve each footnote reference control that the paginator encountered after adjusting the cursored body text line. It is already assumed that there is room at the bottom of the page for at least one more footnote text line and that the footnote placement is the bottom of page, not bottom of document.

Resolution is performed one of two ways:

If all of the footnotes on a page can be copied and formatted into the formatted footnote TSB (140), then the limited footnote algorithm is used. This method does a minimal amount of diskette accessing and performs almost all processing in memory. The result is fast formatting and resolution of each footnote reference since all of the formatted footnotes will be in memory when the routine EPAG is called at the end of the page to insert the footnotes at the bottom of the page.

This method is used most of the time for footnote placement at the bottom of a page unless very large footnotes are being processed.

If not all of the footnotes on a page will fit into the formatted footnote TSB 140, then the indefinite footnote algorithm is used. This involves storing the current body text page back onto the diskette unit 24 and moving the TSB point of operation to the page that contains the footnote text to be formatted and resolved (even if the page is in another document). Once the footnote is formatted it is stored back onto the diskette and the TSB point of operation is moved back to its original point in the body text page. With this approach the routine EPAG will fetch the footnote text from diskette unit 24 to the bottom of the page.

Resolution typically involves the following items:

Formatting the footnote text based on the active footnote format. This implies that the Document or Alternate Document Format (whichever is active) will be scanned in order to obtain the parameters required to format the footnote text correctly.

Inserting the appropriate footnote number bracketed within a BFT/EFT control sequence with the appropriate leading/trailing text and/or controls prior to the footnote text.

Calculating the number of footnote text lines corresponding to the footnote reference being processed.

Updating the number of pending footnotes on the current line to be inserted.

Calculating the total vertical escapement due to footnote text that is to be inserted at the bottom of the page. This value is used by the paginator in its page ending decision logic.

Figure 16C:
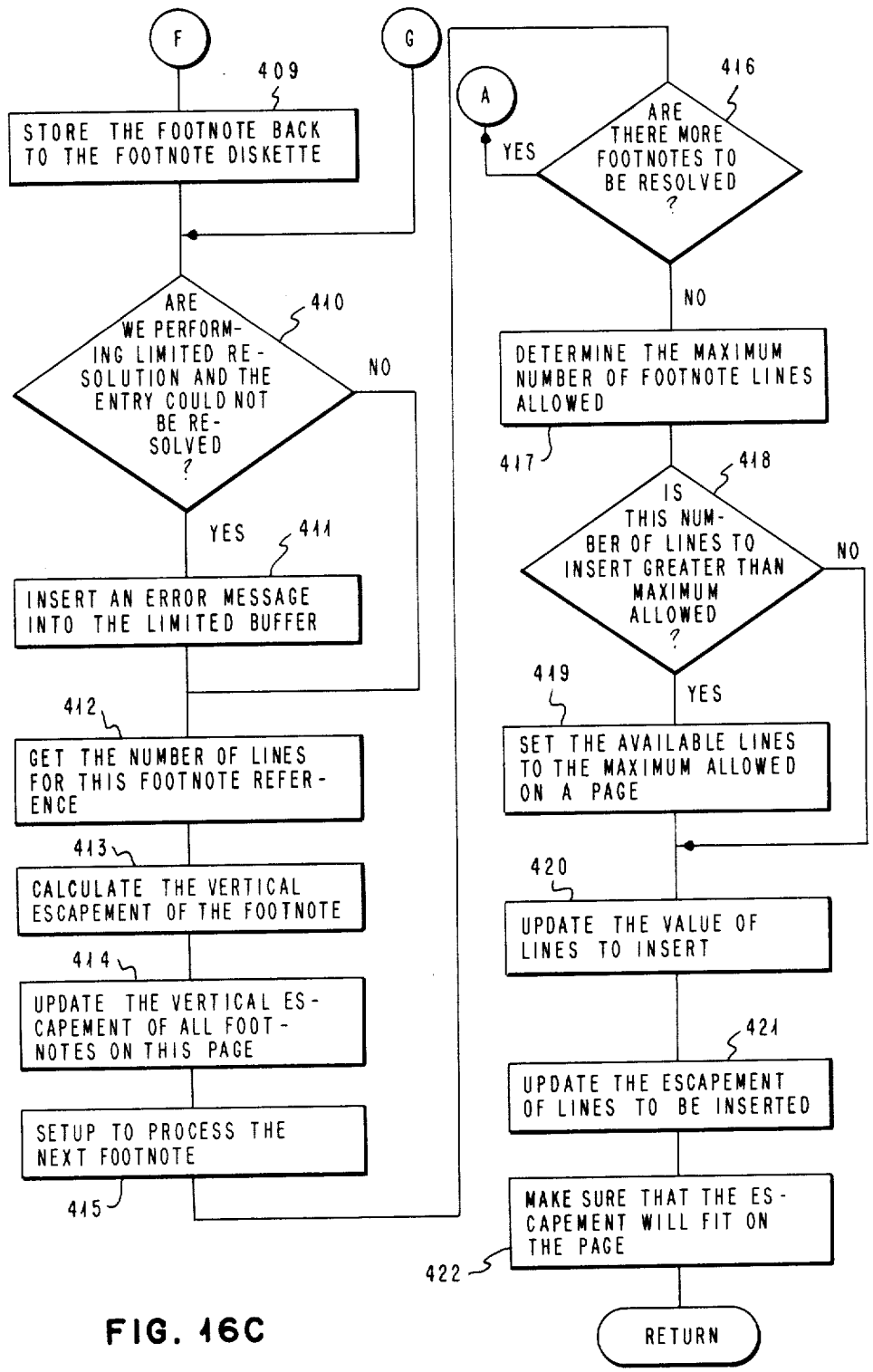
Figure 17A:
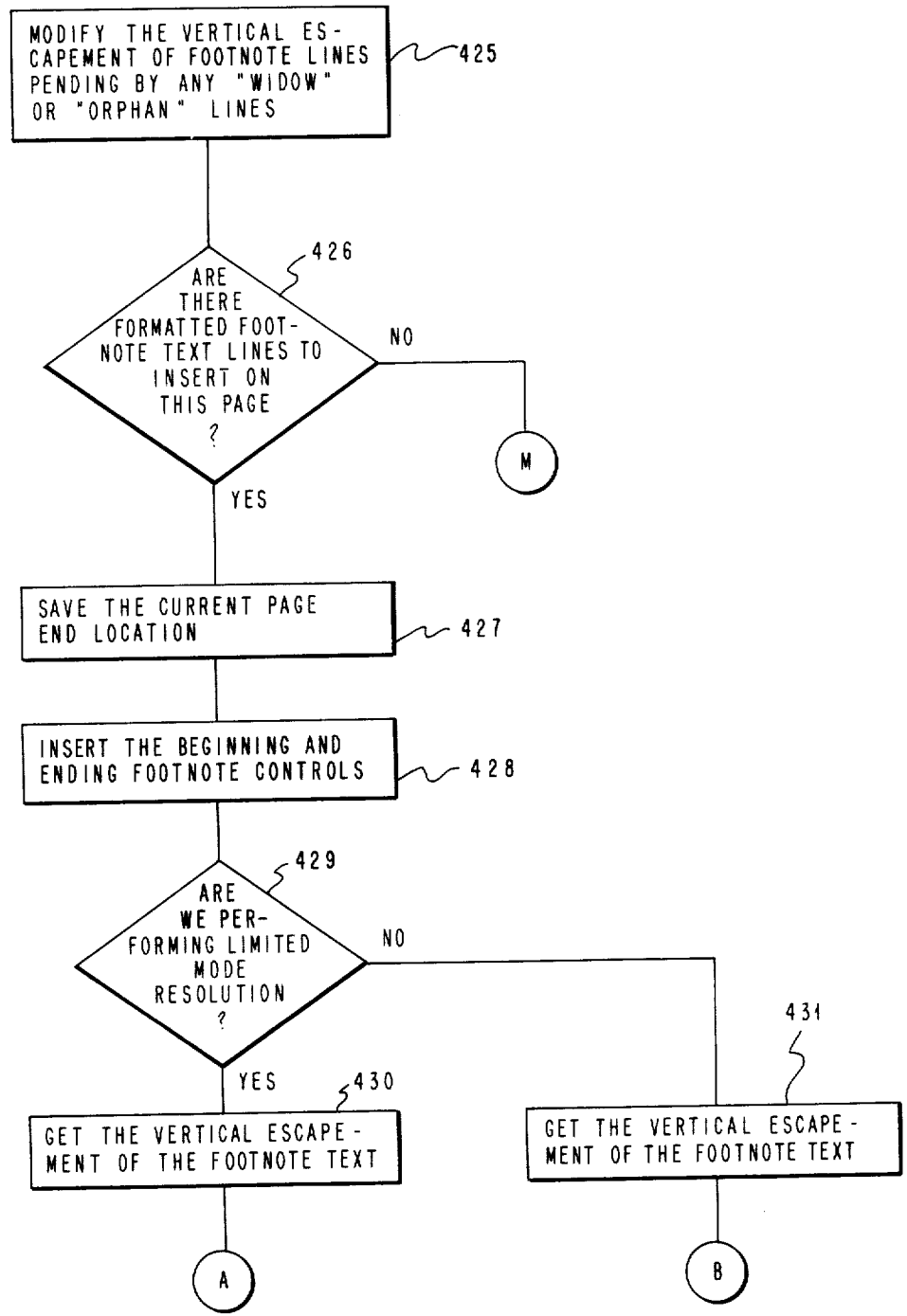
Figure 17B:
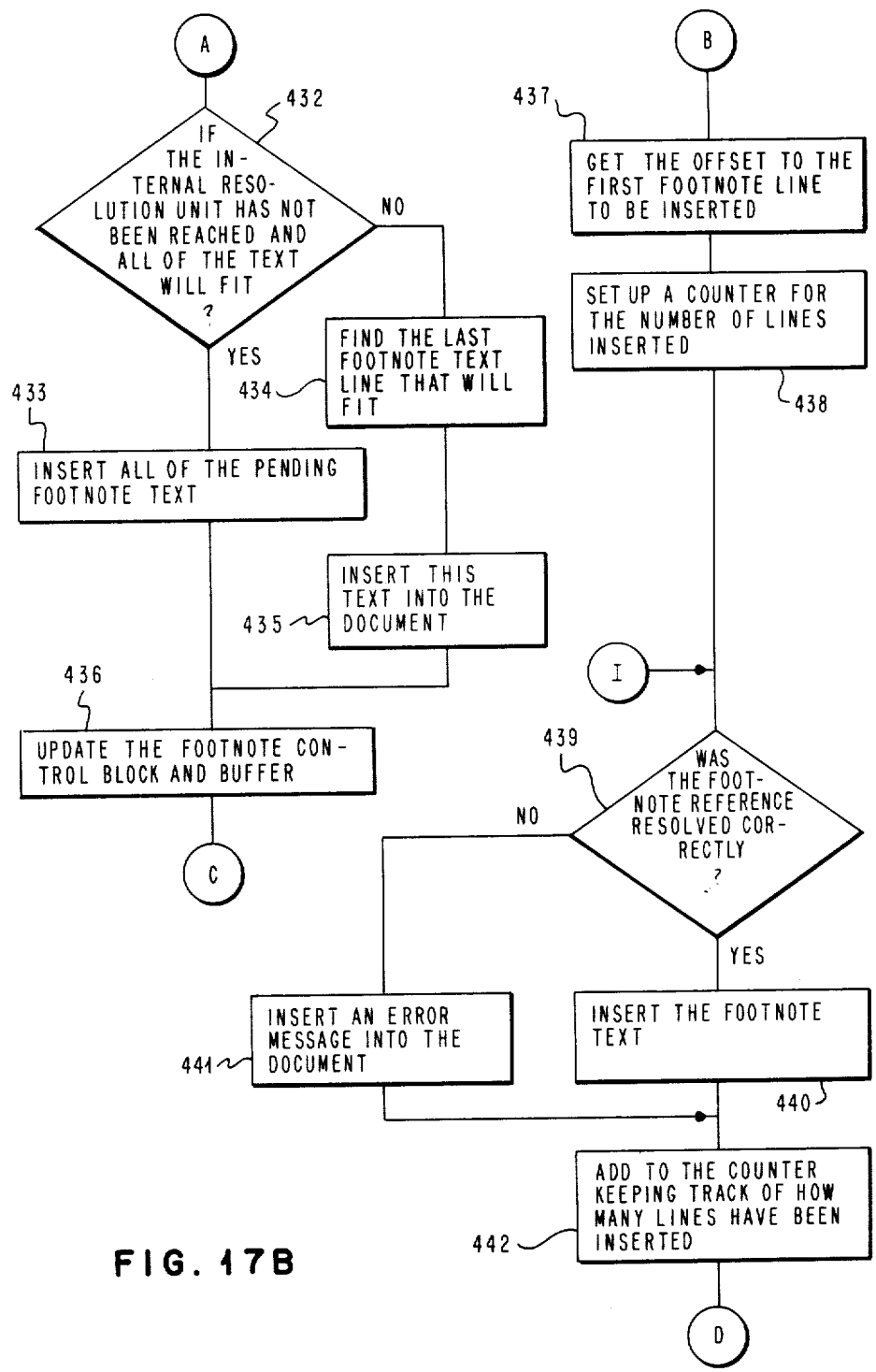
Figure 17C:
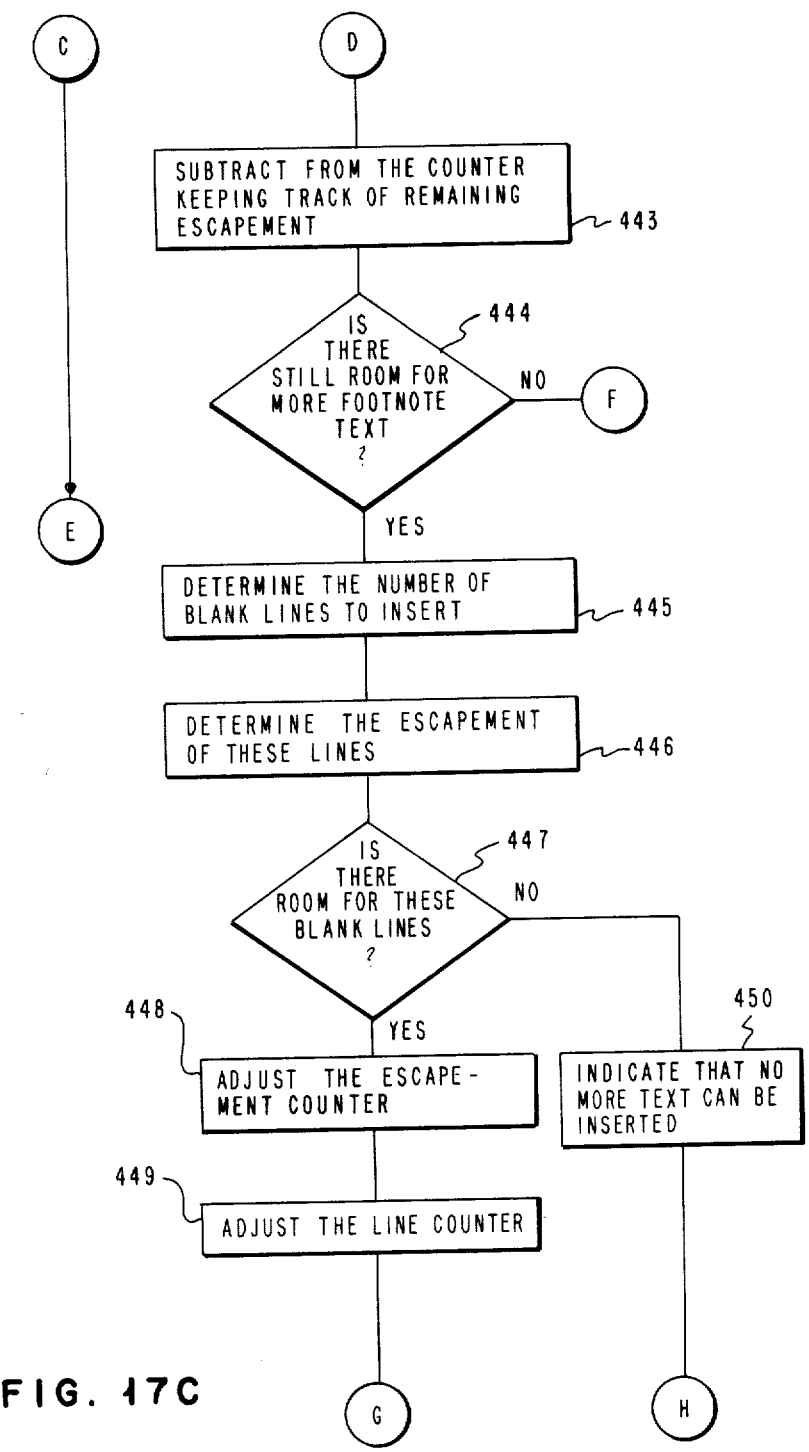
Figure 17D:
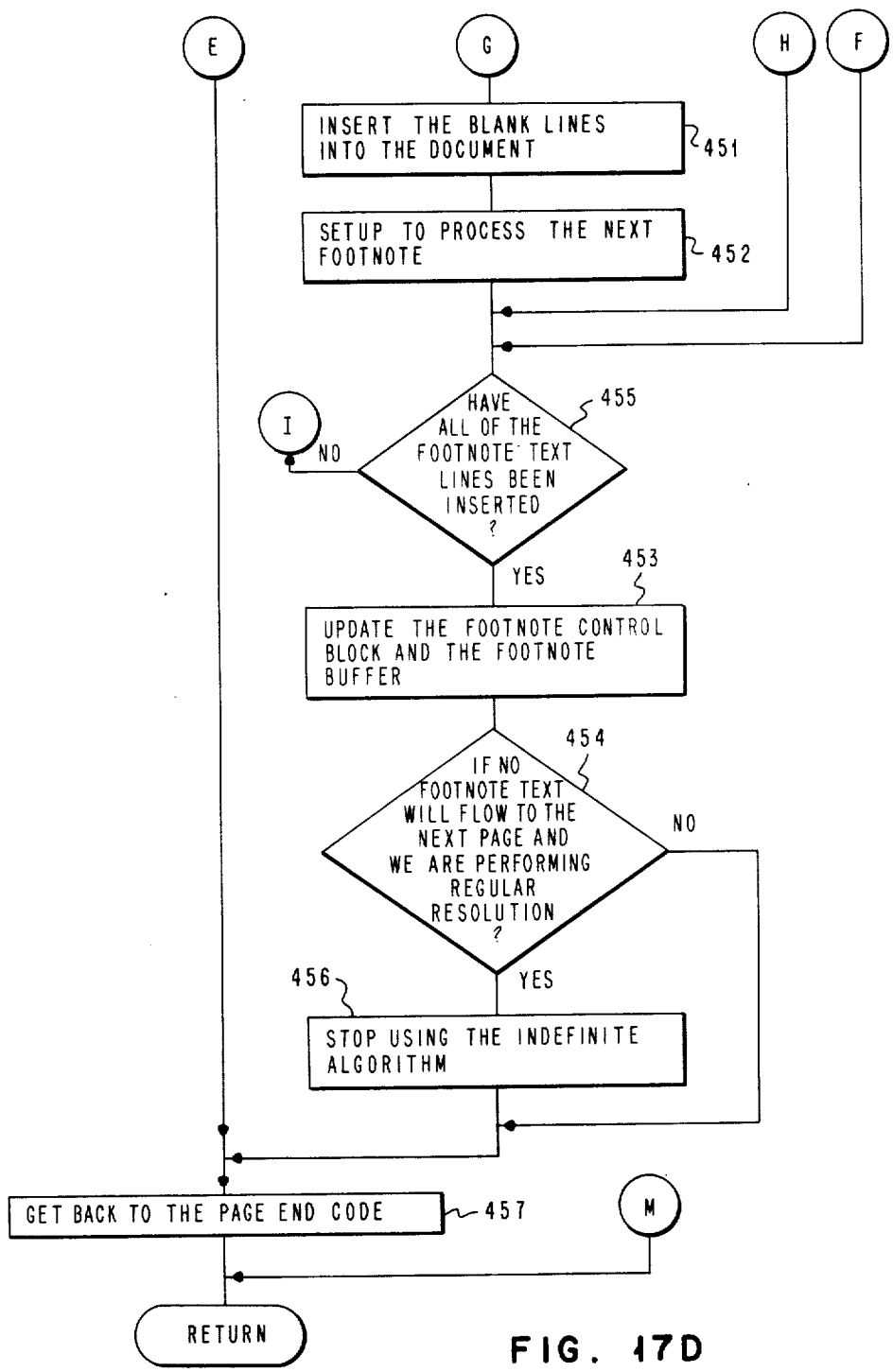
Figure 48:
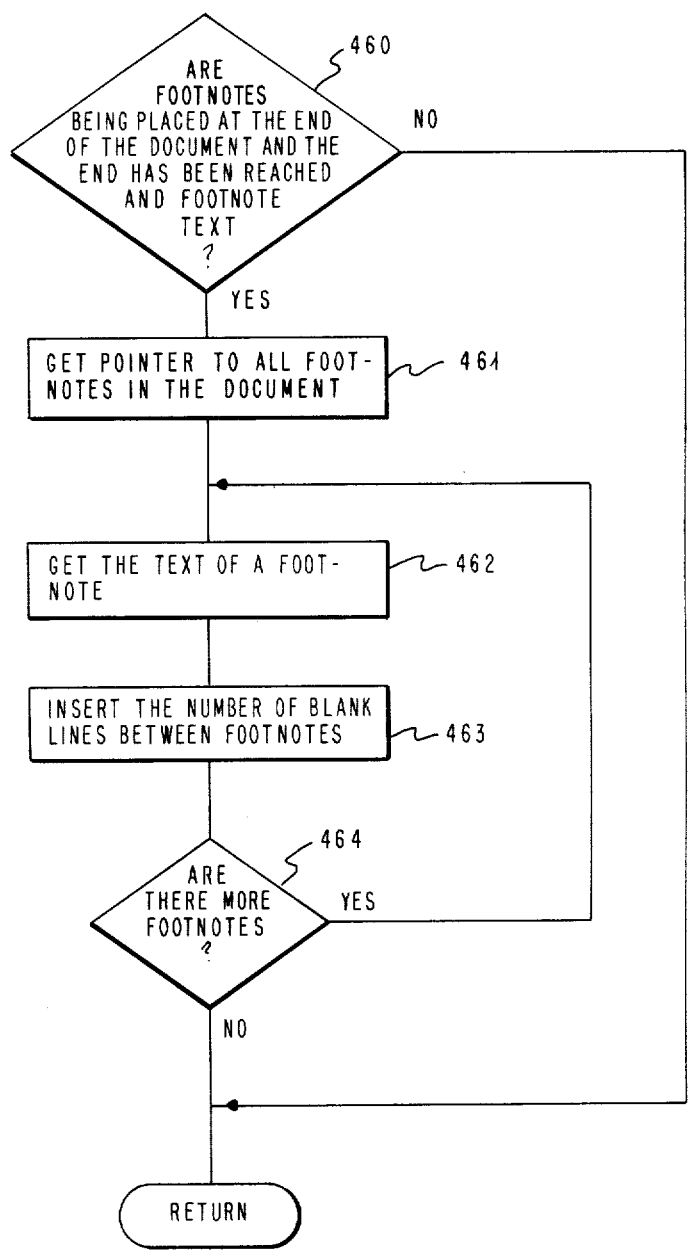

Table 7 is also shown in flow chart form in FIG. 16. The numbers in parenthesis in Table 7 correspond to the reference numerals in FIG. 16.

TABLE 7

```
BEGIN
OBTAIN ADDRESSABILITY TO THE FIRST FOOTNOTE
REFERENCE TO BE RESOLVED (385)
UNTIL THERE ARE NO MORE FOOTNOTES TO BE RE-
SOLVED DO (416)
IF PERFORMING LIMITED RESOLUTION AND BLANK
LINES (386)
MUST BE INSERTED TO DELIMIT THIS FOOTNOTE
THEN
INSERT THE BLANK LINES VIA PROGRAM SEGMENT
BLANK__LN
ENDIF
COPY THE FOOTNOTE TEXT INTO THE LIMITED
TSB AND
DETERMINE THE NUMBER OF FOOTNOTE TEXT
LINES VIA
THE PROGRAM SEGMENT COPY__FN
IF PERFORMING LIMITED RESOLUTION AND
THE ENTRY (410)
COULD NOT BE RESOLVED SUCCESSFULLY THEN
INSERT INTO THE LIMITED TSB THE APPROPRIATE
ERROR MESSAGE (411)
```

TABLE 7-continued

ENDIF
OBTAIN THE NUMBER OF LINES FOR THIS
FOOTNOTE (412)
REFERENCE
CALCULATE THE VERTICAL ESCAPEMENT
THAT WILL BE (413)
GENERATED FOR THE FOOTNOTE TEXT LINES
CORRESPONDING TO THIS FOOTNOTE REFERENCE
UPDATE THE TOTAL VERTICAL ESCAPE-
MENTS FOR ALL (414)
FOOTNOTES ON THIS PAGE
SETUP TO PROCESS THE NEXT FOOTNOTE (415)
ENDDO
UPDATE THE ESCAPEMENT VALUES FOR THE
PAGINATOR VIA
PROGRAM SEGMENT UPDATE
SET AN APPROPRIATE EXIT RETURN CODE
RETURN
BEGSEG (BLANK_LN)
DETERMINE HOW MANY BLANK LINES MUST BE
INSERTED TO (387)
PROVIDE FOOTNOTE SPACING
IF THE PREVIOUS FOOTNOTE DID NOT END
WITH A LINE (388)
ENDING CONTROL THEN
INSERT A REQUIRED CARRIER RETURN TO
FORCE THE (389)
POINT OF INSERTION FOR THE BLANK DELI-
MITER LINES
TO THE START OF A LINE
ENDIF
UNTIL ALL THE BLANK LINES ARE INSERTED
INTO THE
LIMITED TSB BUFFER DO (391)
INSERT A REQUIRED CARRIER RETURN PRIOR
TO THE (390)
POINT OF OPERATION
ENDDO
ENDSEG (BLANK_LN)
BEGSEG (COPY_FN)
IF PERFORMING LIMITED FOOTNOTE ALGOR-
ITHM RESOLUTION (392)
THEN COPY THE FOOTNOTE TEXT INTO THE FORMATTED
FOOTNOTE LIMITED TSB (393)
ELSE
GO TO THE FOOTNOTE PAGE VIA THE INDEFI-
NITE LENGTH
DOCUMENT TSB BY MOVING THE TEXT STORAGE
BUFFER
POINT OF OPERATION TO THE DESIRED FOOT-
NOTE PAGE (394)
ENDIF
INSERT THE FOOTNOTE NUMBER SEQUENCE PRIOR TO
THE (395)
FOOTNOTE TEXT
SETUP A COUNTER THAT WILL KEEP TRACK OF THE
NUMBER (396)
OF FOOTNOTE TEXT LINES FOR THE FOOTNOTE
REFERENCE
CONTROL
UNTIL THE END OF THE FOOTNOTE TEXT IS FOUND DO
(399)
ADJUST THE FOOTNOTE TEXT LINE BETWEEN THE LEFT
AND
RIGHT MARGINS (397)
INCREMENT THE COUNTER THAT IS KEEPING TRACK OF
THE (398)
NUMBER OF FOOTNOTE TEXT LINES
ENDDO
IF THERE ARE NO LINES IN THE FOOTNOTE TEXT PAGE
THEN (400)
INSERT A REQUIRED CARRIER RETURN (401)
SET THE NUMBER OF LINES FOR THIS ENTRY TO 1 (402)
ENDIF
SAVE THE NUMBER OF TEXT LINES CALCULATED IN THE
ENTRY'S LINE COUNT FIELD (403)
IF NOT PERFORMING LIMITED TSB MODE RESOLUTION
THEN (404)
IF THE FOOTNOTE TEXT PAGE'S PAGE ENDING CONTROL
IS
NOT AT THE START OF A LINE THEN (405)
INSERT A REQUIRED CARRIER RETURN PRIOR TO THE

TABLE 7-continued

PAGE END CONTROL (406)
ENDIF
MOVE THE POINT OF OPERATION TO THE START OF THE
FOOTNOTE TEXT PAGE (407)
DELETE THE FOOTNOTE NUMBER SEQUENCE. THE
ROUTINE (408)
EPAG WILL INSERT LATER
STORE THE FORMATTED FOOTNOTE TEXT PAGE BACK
TO THE
FOOTNOTE DISKETTE (409)
ENDIF
ENDSEG (COPY_FN)
BEGSEG (UPDATE)
DETERMINE THE MAXIMUM NUMBER OF FOOTNOTE
TEXT LINES (417)
THAT MAY BE INSERTED IN A PAGE
IF THE NUMBER OF AVAILABLE LINES TO INSERT IS (418)
GREATER THAN THE MAXIMUM NUMBER OF FOOTNOTE
TEXT
LINES THAT MAY BE INSERTED IN A PAGE THEN (419)
SET THE NUMBER OF AVAILABLE LINES TO INSERT
EQUAL
TO THE MAXIMUM NUMBER OF FOOTNOTE TEXT LINES
THAT
MAY BE INSERTED IN A PAGE
ENDIF
UPDATE THE NEW VALUE FOR NUMBER OF TEXT LINES
TO (420)
INSERT
UPDATE THE NEW VALUE FOR ESCAPEMENT DUE TO
TEXT (421)
LINES THAT ARE TO BE INSERTED
INSURE THAT THE CALCULATED ESCAPEMENT WILL
ALL FIT (422)
IN THE CURRENT PAGE. ADJUST VALUE IF THE
ESCAPEMENT
IS TOO MUCH
ENDSEG (UPDATE)
END (GETFN)

The purpose of the routine EPAG in Table 8 is to move FORMATTED footnote text to the end of the current page. The footnote text resides either in the formatted footnote TSB 140 (if the limited algorithm is used) or on pages in the footnote library (in a separate document or on page 9000 or above if in the same document). Table 8 is also shown in flow chart form in FIG. 17. The numbers in parenthesis in Table 8 correspond to the reference numerals in FIG. 17.

Upon invocation, a page end decision has been made by the paginator and the TSB point of operation is at the start of a line. This line will be forced to the next page via the insertion of a page end control, but before the page end control is inserted, this routine must insert (prior to the TSB point of operation) the appropriate number of formatted footnote text lines along with all the necessary formatting controls. All the information required for these insertions is available in the footnote control block 108 and footnote reference buffer 110.

After determining how many lines it must insert, this routine inserts the necessary formatting controls to precede the footnote text, the separator line, and the formatting controls to following the footnote text.

After the formatting controls are inserted, this routine either fetches all of the formatted footnote text from the formatted footnote TSB 140 (if the limited algorithm was able to be used) or (if the indefinite length algorithm had to be used) then it fetches in the footnote text for the first footnote. The footnote's respective entry in the footnote reference buffer 110 contains the pointers to each footnote text page. Note that the footnote reference buffer 110 causes the system to have an "internal resolution limit" of about 20 footnotes per page if each footnote is stored in a separate document and up to 142 footnotes per page if each footnote is stored on page 9000 or above of the same document that contains the body text with the corresponding footnote references.

If necessary, lines that have been inserted in the previous page will be deleted after the entire footnote text is fetched.

If the entire footnote fits and more footnote text is pending, the insertion sequence will continue with the next footnote.

If the entire footnote won't fit, then the footnote text that won't fit will be deleted. These lines will appear on the next page.

After the insertion is complete, the necessary pointers in the footnote resolution control block 108 are updated. The footnote resolution buffer will also be updated to reflect the insertions.

TABLE 8

```
BEGIN
MODIFY THE VERTICAL ESCAPEMENT DUE TO PENDING (425)
FOOTNOTE TEXT LINES THAT ARE TO BE INSERTED AT THE
BOTTOM OF THIS CURRENT PAGE DUE TO ANY "WIDOW" OR
"ORPHAN" LINE DECISIONS MADE BY THE PAGINATOR
IF IT HAS BEEN DETERMINED THAT THERE ARE FORMATTED (426)
FOOTNOTE TEXT LINES TO INSERT AT THE BOTTOM OF THIS
CURRENT PAGE THEN
SAVE THE CURRENT PAGE END LOCATION (427)
INSERT PRIOR TO THE CURRENT POINT OF OPERATION THE (428)
FOOTNOTE TEXT FORMATTING SEQUENCE THAT WILL
ENCAPSULATE THE PENDING FOOTNOTE TEXT
IF PERFORMING LIMITED MODE TSB ALGORITHM THEN (429)
INSERT THE PENDING FOOTNOTE TEXT VIA PROGRAM (430)
SEGMENT LIMITED
ELSE
INSERT THE PENDING FOOTNOTE TEXT VIA PROGRAM (431)
SEGMENT INDEF
ENDIF
RESTORE POINT OF OPERATION TO PAGE END LOCATION (457)
ENDIF
RETURN
BEGSEG (LIMITED)
OBTAIN THE VERTICAL ESCAPEMENT OF THE FOOTNOTE TEXT
LINES TO BE INSERTED
IF THE INTERNAL RESOLUTION LIMIT HAS NOT BEEN (432)
REACHED AND ALL OF THE PENDING FOOTNOTE TEXT WILL
FIT THEN
INSERT ALL OF THE PENDING FOOTNOTE TEXT (433)
ELSE
ADVANCE TO THE TOP OF THE LIMITED TSB BUFFER (434)
MOVE THE POINT OF OPERATION TO THE END OF THE LAST
FOOTNOTE LINE THAT IS TO BE COPIED
INSERT INTO PAGE THE FOOTNOTE TEXT THAT IS BOUNDED (435)
BY THE TOP OF LIMITED TSB BUFFER AND THE POINT OF OPERATION
ENDIF
UPDATE THE FOOTNOTE CONTROL BLOCK AND FOOTNOTE (436)
REFERENCE BUFFER TO REFLECT THE NUMBER OF FOOTNOTE
TEXT LINES INSERTED
ENDSEG (LIMITED)
BEGSEG
```

TABLE 8-continued

```
OBTAIN THE VERTICAL ESCAPEMENT DUE TO FOOTNOTE TEXT
LINES THAT ARE TO BE INSERTED
OBTAIN THE OFFSET TO THE FIRST FOOTNOTE ENTRY IN (437)
THE FOOTNOTE RESOLUTION BUFFER
SETUP A COUNTER FOR THE NUMBER OF LINES INSERTED (438)
UNTIL ALL THE FOOTNOTE TEXT LINES THAT ARE TO APPEAR
ON THIS PAGE ARE INSERTED DO (455)
IF THE FOOTNOTE REFERENCE WAS RESOLVED (439)
SUCCESSFULLY THEN
INSERT THE FOOTNOTE TEXT (440)
ELSE
INSERT INTO TEXT THE APPROPRIATE FOOTNOTE (441)
RESOLUTION ERROR MESSAGE
ENDIF
ADD TO THE COUNTER KEEPING TRACK OF HOW MANY LINES (442)
HAVE BEEN INSERTED THE NUMBER OF INSERTED LINES
FOR THIS FOOTNOTE
SUBTRACT FROM THE COUNTER KEEPING TRACK OF HOW (443)
MUCH ESCAPEMENT REMAINS TO BE INSERTED BY THE
INSERTED ESCAPEMENT
IF THERE IS STILL MORE ROOM FOR FOOTNOTE TEXT THEN (444)
DETERMINE THE NUMBER OF BLANK LINES TO INSERT (445)
FOR FOOTNOTE SPACING
DETERMINE THE ESCAPEMENT DUE TO THESE BLANK (446)
LINES
IF THERE IS ROOM FOR THESE BLANK LINES THEN (447)
ADJUST THE INSERTION ESCAPEMENT COUNTER (448)
ACCORDINGLY
ADJUST THE INSERTION LINE COUNTER ACCORDINGLY (449)
INSERT THE BLANK LINES INTO TEXT (451)
SETUP TO PROCESS THE NEXT FOOTNOTE (452)
ELSE
INDICATE THAT NO MORE FOOTNOTE TEXT CAN BE (450)
INSERTED
ENDIF
ENDIF
ENDDO
UPDATE THE FOOTNOTE CONTROL BLOCK AND FOOTNOTE (453)
REFERENCE BUFFER TO REFLECT THE NUMBER OF FOOTNOTE
TEXT LINES INSERTED
IF THERE WILL BE NO FOOTNOTE TEXT LINES FLOWING TO (454)
THE NEXT PAGE AND SYSTEM IS PERFORMING REGULAR
RESOLUTION THEN
STOP USING THE INDEFINITE ALGORITHM SO THAT THE (456)
LIMITED ALGORITHM WILL BE USED ON THE NEXT PAGE
ENDIF
ENDSET (INDEF)
END (EPAG)
```

Table 9 is also shown in flow chart form in FIG. 18. The numbers in parenthesis in Table 9 correspond to the reference numerals in FIG. 18.

TABLE 9

```
BEGIN (EDOC)
IF FOOTNOTES ARE BEING PLACED AT THE END OF THE (460)
DOCUMENT AND THE END OF THE DOCUMENT HAS BEEN
REACHED AND NO FOOTNOTE TEXT HAS BEEN RESOLVED THEN
OBTAIN POINTER TO THE FOOTNOTE REFERENCE BUFFER (461)
CONTAINING POINTERS TO EVERY FOOTNOTE FOUND IN THE
DOCUMENT
```

TABLE 9-continued

UNTIL THE LAST REFERENCE HAS BEEN RESOLVED DO (464)
FETCH FOOTNOTE TEST (462)
INSERT THE NUMBER OF BLANK LINES AS SPECIFIED BY (463)
THE "NUMBER OF BLANK LINES BETWEEN FOOTNOTES" PARAMETER
ENDDO
ENDIF
END TABLE 9 (EDOC)

In summary, unique method of, and system for, designating footnotes and footnote references is provided in order to reduce operator attention and errors, and meet author desires and needs. Prior to input of a document, a menu is presented to the operator for selecting and defining a makeup of desired footnote and footnote reference designations. The operator has the flexibility of defining designations by specifying a variable data category such as a numeric or other graphic character, the initial variable data such as the numeral 3, fixed data surrounding the variable data such as parenthesis, and a vertical location for the designations such as half indexed up on a line. Thereafter, body text is keyed up to a footnote reference point. During this body text keying, the text is displayed and editing is permitted. At the footnote reference point, a menu is called from which a footnote task is selected. This causes a display frame to be presented for keying the footnote. Editing of the footnote is also permitted. Following input of the footnote, the operator recalls the body text display frame for continued keying, and the footnote is stored away in a footnote library. Upon recall of the body text display frame, the system applies an appropriate footnote reference designation to the body text in a defined vertical location at the footnote reference point, and logs the location in the footnote library of the corresponding footnote. For example, if a previous footnote reference designation were a bracketed two ([2]), half indexed up on a line, the appropriate footnote reference designation would be a bracketed three ([3]), half indexed up on the line being operated upon. The operator also has the ability to update the variable data, reset the variable data to its initial value, and select new variable data to be intermingled with initially selected variable data, with the system providing the necessary and desired sequencing. For example, the operator can cause the designation at the next footnote reference point to be an underscored asterisk (*) by re-specifying the variable data, and the surrounding fixed data. A subsequent reference point designation will be **. A recall of the original designation makeup will result in the next reference point being designated with a bracketed four ([4]), half indexed up on the line. As such, the system automatically manages designation of footnote references and corresponding footnotes once the designations have been defined or updated. Should later editing necessitate changes in the variable data, this will also be automatically taken care of by the system. Following input keying of the body and footnote text, operator procedure calls for causing the system to assemble the body and footnote text. The assembly operation involves combined merge and pagination operations. Following assembly, the document can be display recalled on a page basis for review and editing. Thereafter, the document is ready to be printed.

While the invention has been particularly shown and described with reference to a preferred embodiment, it will be understood by those skilled in the art that various changes in form and detail may be made without departing from the spirit and scope of the invention.

What is claimed is:

1. In a keyboard/display word processing system, a method of causing footnotes and footnote references to be designated beginning with an operator selected marking designation which can include fixed and variable portions, said method comprising:
   (a) inputting to said system for selecting said designation by:
      (1) specifying a category for said variable portion; and
      (2) specifying a beginning for said variable portion for designating a first set of said footnotes and footnote references; and
   (b) following selecting said marking designation, causing marking designations to be applied to subsequent sets of said footnotes and footnote references to be changed by said system such that each set will be distinctively designated upon combination of separately stored footnote text and body text during assembly of a document.

2. A method according to claim 1 wherein selecting a category includes selecting between a numeric or other graphic character for said variable portion.

3. A method according to claim 2 including causing a footnote reference point for said first set to be system designated following preparation of a corresponding footnote for said first set.

4. A method according to claim 3 including causing said first set to be designated with a number of said other graphic characters corresponding to said selected beginning when said other graphic character category has been selected.

5. A method according to claim 4 including causing said first set to be designated with a selected number when a numeric category has been selected.

6. A method according to claim 5 including adding one graphic character to each succeeding set of designations for said footnotes and footnote references following said first set when said other graphic character category has been selected.

7. A method according to claim 6 including selecting an indexed position for said designations and causing said designations to designate said footnotes and footnote references in an indexed position.

8. A method according to claim 7 including defining said fixed portion by selecting a character to accompany said variable portion and causing said character to accompany said variable portion when said footnotes and footnote references are designated.

9. A method according to claim 8 including causing said variable portion to be reset on a chapter basis.

10. A method according to claim 6 including selecting a different category following (a) selecting said category, and (b) a footnote reference point being designated, for causing a subsequent footnote reference point to be designated according to said different category.

11. A method according to claim 10 including reselecting said category following a footnote reference point being designated according to said different category for causing a subsequent footnote reference point to be designated according to said different category for causing a subsequent footnote reference point to be designated according to said category.

* * * * *